US008370537B2

(12) United States Patent
Yu et al.

(10) Patent No.: US 8,370,537 B2
(45) Date of Patent: Feb. 5, 2013

(54) TRIGGER ROUTER AND TEST SYSTEM INCLUDING THE TRIGGER ROUTER

(75) Inventors: Sylvester Yu, Anaheim, CA (US); Jeffrey Norris, Lake Forest, CA (US); Xiaokun Hu, Irvine, CA (US); Daniel Masters, Mission Viejo, CA (US); Timothy Elmore, Cypress, CA (US); Gary Carlson, Alison Viejo, CA (US)

(73) Assignee: EADS North America, Inc., Irvine, CA (US)

( * ) Notice: Subject to any disclaimer, the term of this patent is extended or adjusted under 35 U.S.C. 154(b) by 585 days.

(21) Appl. No.: 12/584,461

(22) Filed: Sep. 5, 2009

(65) Prior Publication Data

US 2010/0076715 A1 Mar. 25, 2010

Related U.S. Application Data

(60) Provisional application No. 61/094,969, filed on Sep. 7, 2008.

(51) Int. Cl.
G06F 3/00 (2006.01)
G06F 13/00 (2006.01)

(52) U.S. Cl. ............... 710/15; 710/5; 710/8; 710/33; 710/62

(58) Field of Classification Search ................ None
See application file for complete search history.

(56) References Cited

U.S. PATENT DOCUMENTS 7,152,186 B2 * 12/2006 Airaud et al. ............... 714/30
2005/0182583 A1 * 8/2005 Miyazaki et al. ........... 702/117

* cited by examiner

*Primary Examiner* — Scott Sun

(57) ABSTRACT

A test system 100 that can accept a plurality of plug-in electronic cards in Xi Slots 126 or PXI slots 134 is described. The test or source measure switching system 100 includes a sequencer or sequence engine 130 which is fully capable of executing opcode instructions having potentially indefinite completion times and monitoring multiple asynchronous inputs simultaneously without interrupts. The sequencer 130 is sequential and deterministic to approximately 10 microsecond resolution. The sequencer 130 includes a trigger router which can be a fully configurable trigger input and trigger output routing matrix. Every trigger input can be configured via several detection modes such as active high, active low, level high and level low. Also, trigger outputs can be configured to be triggered on single, multiple or auto triggers if set.

7 Claims, 15 Drawing Sheets

Trigger Router Matrix

TRIGGER ROUTER AND TEST SYSTEM INCLUDING THE TRIGGER ROUTER

CROSS REFERENCE TO RELATED APPLICATIONS

This application claims the benefit of U.S. Provisional Patent Application No. 61/094,969, filed Sep. 7, 2008, which is incorporated herein by reference in its entirety.

FIELD OF THE INVENTION

This invention relates to electronic systems and more particularly to trigger router and a test system with trigger router.

BACKGROUND

Unlike single function instruments where the firmware is largely static after development, since hardware functionality is predefined and fixed, a multi-purpose test system such as a source measure switching system with plug-in cards that can be removed and inserted in the field does not have this luxury. As new plug-in cards such as switching, signal source, and instrumentation plug-in cards for the platform are developed, inevitably the main firmware of the test system, which can also be referred to as a source measure switching system, will suffer from a lack of awareness and support features for the new plug-in cards that precludes its use without modification.

From a solution standpoint, several options address the issue mentioned above. The simplest option is to mandate firmware upgrades each time a new plug-in card development occurs. While this is the simplest option, it is also the most costly for both the manufacturer and the customer and limits the appeal of the instrument, given the fairly constant need for upgrades to the firmware.

The second option takes classes of general plug-in card descriptors to describe different cards in a reasonably generic manner. Each plug-in card carries a descriptor that the source measure switching system can then read to determine specific properties of the plug-in card. Although this solution offers significantly better adaptability than the first, when a new plug-in card can not fit into one of the existing descriptor classes, a mainframe firmware update would be required in order to describe the functionality of the new class of card. This solution also suffers from the problem that it requires a certain degree of rigidity and conformity, even within a descriptor class, to make the solution viable. This fact effectively limits the ability to create inexpensive hybrid cards that can meet the specific needs of semi-custom, customer-driven applications as an illustrative example.

Test system environments typically require the ability to switch signals from one instrument or instrument to another, be able to measure signals, or detect stimulus actions in a high speed and deterministic manner. Given the space premium found in today's testing environments, test applications require test systems that can provide the ability to detect and generate trigger signals for the test system while occupying the least amount of space and provide for maximum flexibility.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION

Figure 1:
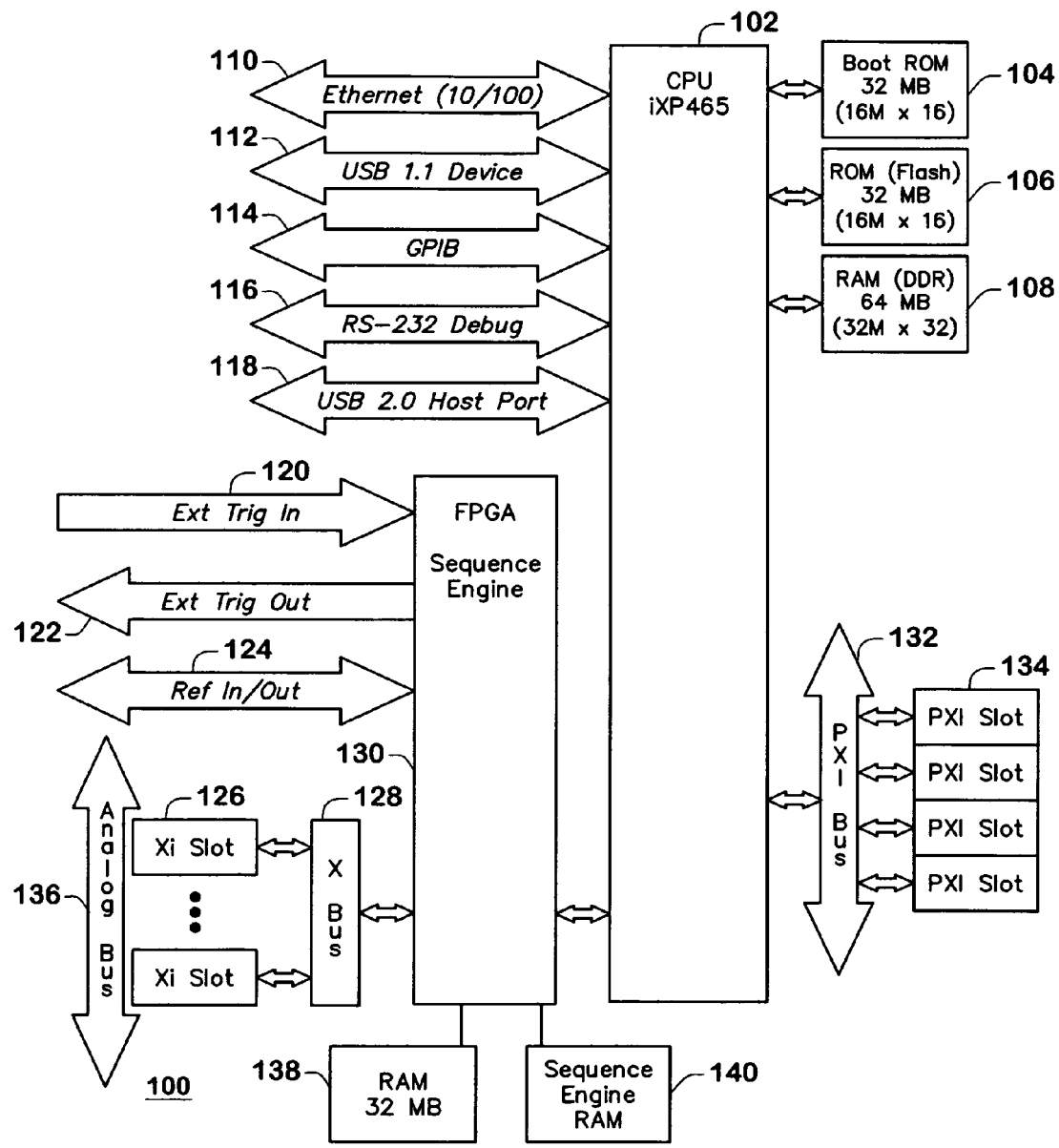
FIG. 1 shows a test system in accordance with an embodiment of the invention.

While the specification concludes with claims defining the features of the invention that are regarded as novel, it is believed that the invention will be better understood from a consideration of the following description in conjunction with the drawing figures.

The present invention provides for a test system with trigger router that has the ability to route and configure trigger signals between a controller, intermodules and from external sources, coupled with the use of a deterministic sequencer that provides deterministic timing when operating in conjunction with a central processing unit (CPU) as shown in FIG. 1.

Non-Real-Time Operating Systems ("Non-RTOS") such as Linux or Windows allow the use of standardized development tools and environments with the disadvantage of their non-deterministic timing that can be a drawback in test system environments where tight system timing and measurement throughput are important. Alternatively, real-time versions of Linux or Windows are available, but they incur increased development complexity and other tradeoffs.

Referring now to FIG. 1, there is shown a block diagram highlighting a test or source measure switching system 100 in accordance with one embodiment of the invention. Test system 100 includes a controller such as a network processor 102. In one embodiment, the controller comprises an Intel IXP-465 X-scale network processor running a Linux operating system. Other types of high performance controllers as well as other operating systems known in the art can be used for controller 100. A boot Read-Only Memory (ROM) 104 of 64 MB of flash memory loads the operating system from the ROM 106 which holds the Linux OS image. A 64 MB DDR Random Access Memory (RAM) memory 108 holds the OS RAM and also holds measurement samples.

The source measure switching system 100 also includes in one embodiment a 10/100 Base T Ethernet port 110 which can be used for system communications as well as downloading new operating system versions and LXI web pages. A USB 1.1 device port 112 allows for an alternative command port to the Ethernet port 110. An IEEE-488 standard interface or GPIB bus 114 provides a further alternative command port. A RS-232 interface 116 is used for transferring debug messages (Linux console output). A USB 2.0 Host port 118 allows for connection to an external USB storage device to store/recall scan lists and sequences.

An external Trigger In (TRIG IN) input 120 is routed to a sequence engine 130 so that a trigger signal can be routed through a system trigger matrix to other slots, the sequence engine, etc. in the source measure switching system 100. An external Trigger Out (TRIG OUT) output 122 is routed through the trigger router located within the sequence engine 130 in order to provide a variety of trigger options as will be discussed further below. A Reference In/Out (REF IN/OUT) clock router interface 124 allows a reference clock input to be routed among the slots, or allows a clock generated from a plug-in module to be routed to the output. The REF IN/OUT 124 can be programmed as an input or an output. A bus referred herein as the X Bus 128 allows for one or more Xi slot card slots 126 which can accept switching cards or instrument plug-in modules. The X bus in one embodiment comprises a 66 MHz instrument bus to communicate with the Xi cards; the X bus includes data verification and auto-retry. The X bus will be discussed further below. The Xi card slots 126 are also coupled to an analog bus 136. A PXI bus 132 is used as an interface between one or more PXI instrument card slots 134 that can interface/control PXI bus compatible plug-in cards.

In addition to the above, the test system 100 employs a high-speed sequence engine also referred to as a real-time sequencer/scanner 130 capable of making deterministic instrument control operations in microsecond intervals. Contrast this with a microprocessor running the best RTOS available and the performance is at best deterministic to sub-milliseconds, or a Non-RTOS operating system such as Windows or Linux with a non-deterministic multi-millisecond response. In one embodiment the sequencer or sequence engine 130 is implemented via a field programmable gate array (FPGA).

Unlike a microprocessor which typically lacks time determinism (because of interrupts and processing delays), the sequencer 130 used in the source measure switching system 130 is entirely sequential and deterministic to approximately ten-microsecond resolution. It also is fully capable of executing opcode instructions having potentially indefinite completion times and monitoring multiple asynchronous inputs simultaneously without using interrupts—a behavior typically not permissible in ordinary microprocessors. As shown in FIG. 1, sequencer 130 has its own memory 140 for sequence information and data storage. Another memory 138 is also provided for use by the trigger router and other additional functions within the sequencer 130.

In an alternative embodiment, the 130 sequencer can comprise two or more sequencers. For example if two sequencers are present, one is used for immediate command execution and another can be used for deferred use in sequence/scan mode. The two sequencers can be connected to an internal bus arbitrator to prevent contention and also tied to logic necessary for communication over an "X Bus" 128 (described below) interface to one or more installed cards. Additional sequencers beyond two can be utilized for improved system performance, with increased parallel operation and sequence branching. In order to optimize the platform to/for analog, digital, and switching plug in cards, it was necessary to create a new system interface bus which would be optimized for digital control, configurable triggering and interrupts, high speed, fault tolerant, and also include low noise, high-voltage, high-current, and high-bandwidth analog buses. This was accomplished with a new bus design referred to herein as "X-Bus" which includes high-speed low-noise digital communications and both differential and single ended analog buses. The bus structure also includes customizable trigger routing between modules. In addition to the custom bus for specialized instrumentation, the system also includes a standard PXI bus to allow for the inclusion of standard PXI cards.

The control of the plug in card instrumentation requires the application of synchronized and deterministic time-specific commands. This is accomplished in the instrument through sequencer commands and dedicated state machines to control bus communications. The sequencer commands are first defined as high level functional operations which can then be broken down into lower-level sequential operations which can then be stored and executed in a sequencer to control the modules. Rather than creating a new scripting language for the high-level functional operations, our language will be based upon existing industry standard SCPI commands.

In order to reduce CPU and FPGA sequencer external event detection latencies, an autonomous trigger router system is introduced. The trigger router is a fully configurable trigger input and trigger output routing matrix. In one embodiment, the trigger router allows for 16 trigger inputs, although a different number of inputs can be designed for depending on the particular design at hand. Twelve inputs are from twelve slots. Two inputs are from two Scan Sequencers, and two are from two external trigger inputs located on the rear panel of test system 100. The trigger router can also allow for direct connection between modules in order to achieve minimum latency.

In one embodiment, every trigger input can be configured via 4 detection modes: active high, active low, level high, and level low. Every trigger input can be routed to every trigger output. Every trigger output can be configured for input to output delay, output edge active high or active low, output level high or level low, trigger pulse width, trigger repeat cycles (auto or input triggered), and trigger scan interval timer. The trigger scan interval can be configured for up to 1276 hours. Any trigger output can also be configured to be triggered on single trigger, multiple triggers, or auto trigger if set.

Analog Bus

Test system 100 provides an analog bus 136 including 4 pairs of two-wire analog bus and 8 single-ended analog bus lines. The analog bus 136 allows for multiple DMMs to run on separate analog buses. The analog bus lines are designated ABUS1 through ABUS4 for the two-wire buses, and SABUS1 through SABUS8 for the single-ended buses. Each analog bus line is relay-configurable. Normally (at power-up), the slots on the left half of the mainframe (5 Xi slots for one version) are separated from the slots on the right half of the mainframe (4 Xi slots for another version). Each bus can span the halves of the mainframe by closing a relay. There are twelve relay channels that are accessible to the user to connect the analog bus lines.

These channels are controlled by selecting module "0", which refers to the mainframe instead of a plug-in module. The channel numbers associated with these are:

| Channel | Connects |
|---|---|
| 1 | ABUS1 on slots 1-5 to ABUS1 on slots 6-9 |
| 2 | ABUS2 on slots 1-5 to ABUS2 on slots 6-9 |
| 3 | ABUS3 on slots 1-5 to ABUS3 on slots 6-9 |
| 4 | ABUS4 on slots 1-5 to ABUS4 on slots 6-9 |
| 11 | SABUS1 on slots 1-5 to SABUS1 on slots 6-9 |
| 12 | SABUS2 on slots 1-5 to SABUS2 on slots 6-9 |
| 13 | SABUS3 on slots 1-5 to SABUS3 on slots 6-9 |
| 14 | SABUS4 on slots 1-5 to SABUS4 on slots 6-9 |
| 15 | SABUS5 on slots 1-5 to SABUS5 on slots 6-9 |
| 16 | SABUS6 on slots 1-5 to SABUS6 on slots 6-9 |
| 17 | SABUS7 on slots 1-5 to SABUS7 on slots 6-9 |
| 18 | SABUS8 on slots 1-5 to SABUS8 on slots 6-9 |

So, for example, the command CLOSE (@0(1:4)) connects all of the two-wire analog bus lines ABUS1 to ABUS4 on slots 1 through 5 to the analog bus lines ABUS1 to ABUS4 on slots 6 through 9. Similarly OPEN (@0(18)) disconnects analog bus line SABUS8 on slots 1 through 5 from the analog bus line SABUS8 on slots 6 through 9. The analog bus does not provide access to the PXI plug-in modules. Connection to the PXI plug-in modules is accomplished with external cabling. For the plug-in modules which do support connecting to the analog bus, channels 9001 through 9004 shall be used in conjunction with the "[ROUTe:]CLOSe" command to connect to the selected two-wire analog bus lines. Similarly, channels 9011 through 9018 are reserved for connecting the switch card to the single-ended analog bus lines. In order for these channel designations to remain consistent throughout the system, no relay module channel can assign a channel number greater than 8999.

DMM Support

Test system 100 can support up to 4 plug-in PXI DMM in one embodiment. Support levels can be adjusted depending on design requirements. In one embodiment, the DMM model that has been selected for the platform is the Signametrics SMX2064 DMM. This DMM provides up to 7½ digit accuracy.

The following measurement types can be supported in one embodiment of test system 100:
DC Voltage;
AC Voltage;
2-Wire Resistance;
4-Wire Resistance;
6-Wire Resistance;
DC Current;
AC Current;
Capacitance;
Inductance;
Diode Characterization;
Period;
Frequency;
Duty Cycle
Count (Totalize);
Time Interval (pulse width); and
Temperature.

The following stimulus types shall be supported in one embodiment of test system 100 (or designs can includes other stimulus types):
DC Voltage;
AC Voltage; and
Pulse Generator.

Other embodiments of the invention would allow for use of other PXI compatible instruments.

Figure 2:
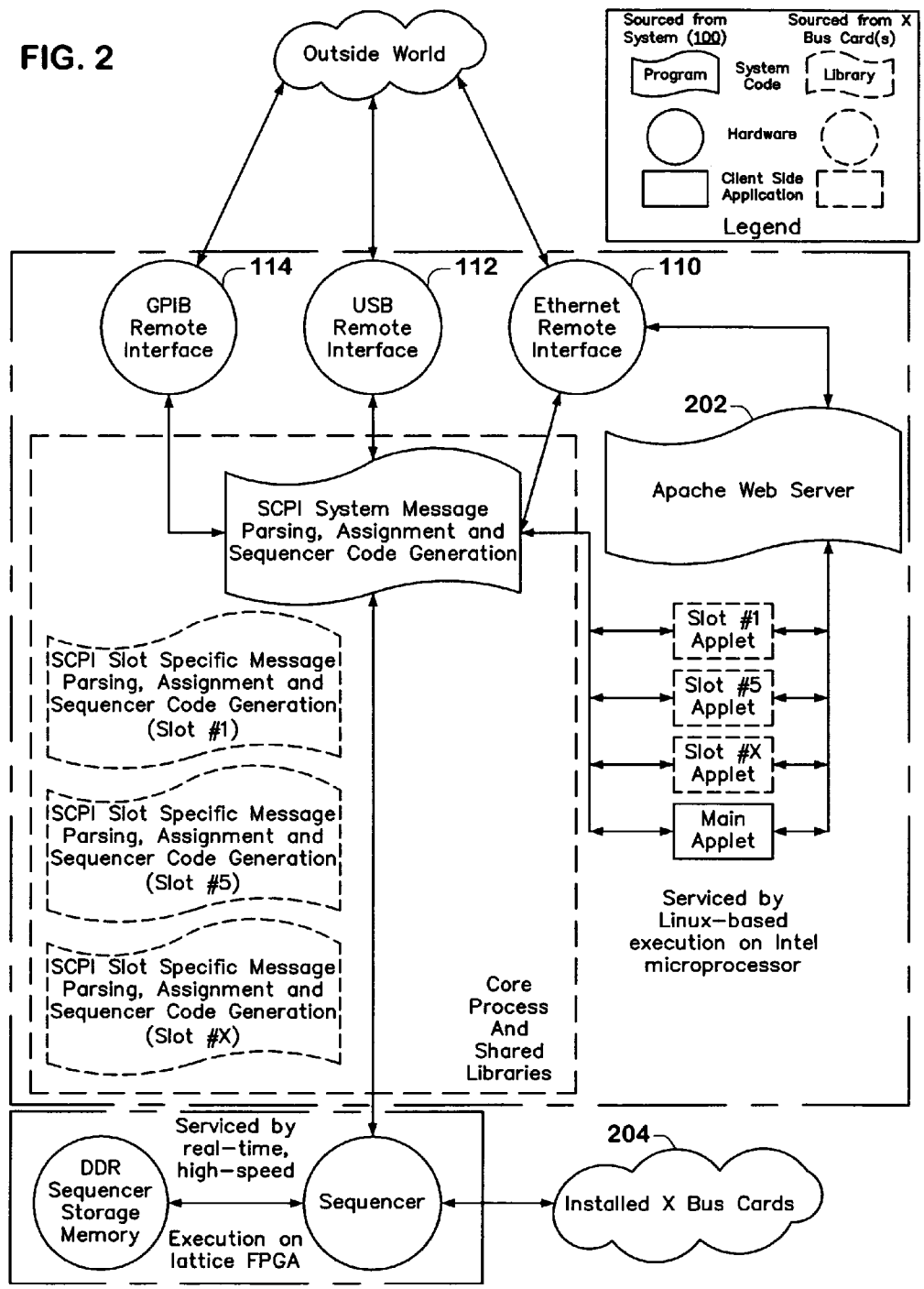
FIG. 2 shows a high level hardware/software model of the test system in accordance with an embodiment of the invention.

In FIG. 2, there is shown a high-level hardware/software model of source measure switching system 100. FIG. 2 shows all the major hardware components in the system responsible for remote communication to the outside world 110, 112, 114, an Apache web-server 202 to facilitate LXI support, the sequencer engine 130, which is the also the communication gateway to all cards 204 present in the system, the single firmware component for the main or core process in the system, and any firmware components sourced by cards present in the system. With this said, the exact features of the proposed software architecture can be broken down further along areas of major functionality.

System Startup and Initialization

Given that the source measure switching system 100 uses a Linux OS in one embodiment, knowing exactly how the system reaches the state described in FIG. 2 proves useful to understanding other architectural components in the system. One of the capabilities of the sequencer 130 and X Bus 128 communication support is an optional feature that allows each card's physical memory space to be accessed in block memory mapped transfers to/from the main CPU memory space. The physical card memory space is not directly accessible from nor is it mapped into the microprocessor's memory space since it is substantially larger than the main CPU supports and is further isolated through the X Bus interface 128. The importance of this feature from a system startup standpoint will become apparent shortly.

Figure 3:
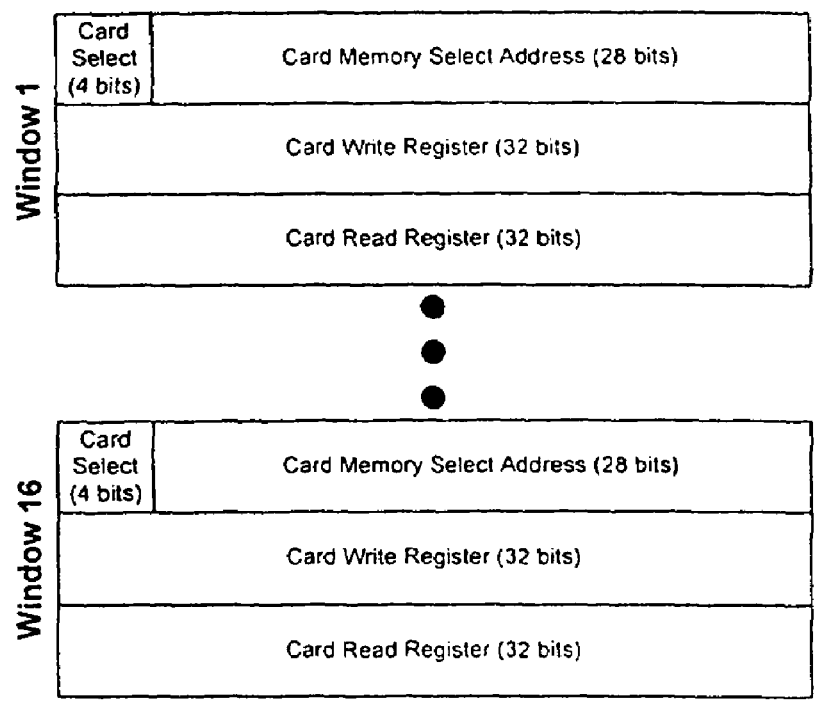
FIG. 3 shows a block diagram of card physical memory access registers in mapped mode.

Prior to describing how startup activities in the source measure switching system 100 use this feature, knowing how it works from a hardware standpoint is critical to deploying it. As shown in FIG. 3, the source measure switching system sequencer FPGA 130 provides a total of 16 separate "windows" capable of accessing the entire 32 bit addressable card memory space for all cards in the embodiment shown. Effectively the sequence engine 130 allocates a physical memory space of $2^{28}$ (268,435,456 bytes) to each card. The upper four bits of the total 32 bit address space determine the desired slot number, 1-12, with slot numbers 13-16 reserved for future use.

The up to 16 separate windows into card memory space allow the core process at its discretion, to assign a unique window to an individual thread. Provided that no other thread inadvertently uses a window not assigned to it, atomicity between operations to the trio of registers within the window is not necessary. Consequently this allows the software architecture to avoid overheads associated with mutex locking necessary to avoid race conditions in a shared arrangement.

The X Bus communication protocol has the ability to pipeline/burst data in block memory-mapped transfer mode for faster transfer times. Once a programmer specifies an address location in the memory select register, the FPGA 130 allows sequential accesses to either the card write or read registers without another update. In fact, it is actually counter-productive to write to the address select register unless necessary since it forces a pipeline/burst reset of the X Bus communication state machine.

Figure 4:
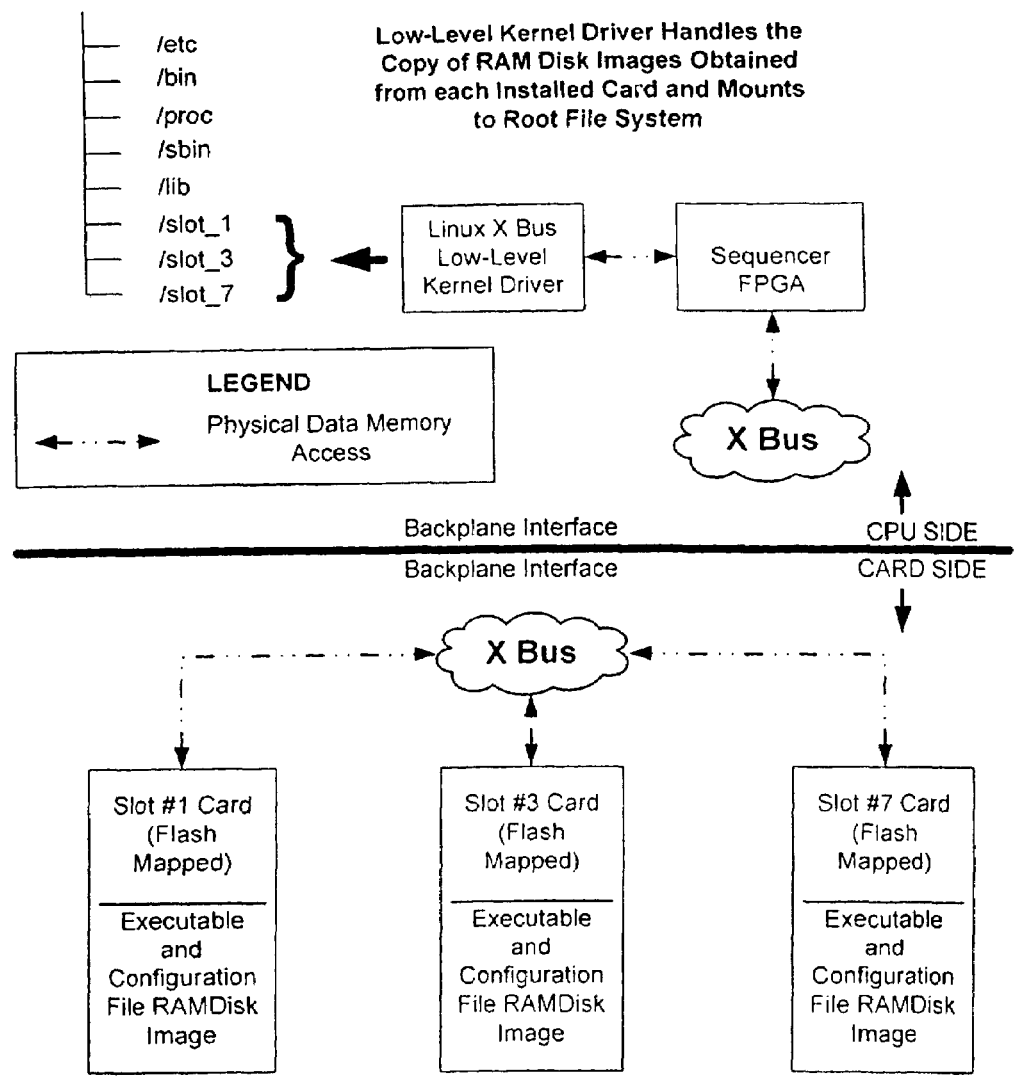
FIG. 4 shows a stage 1 initialization state of the test system in accordance with an embodiment of the invention.

As FIG. 4 highlights, each plug-in card installed in the source measure switching system 100 preferably contains a flash memory device storing a complete image of a Linux ext2 file system. When the Linux kernel starts and completes initial configuration and setup activities, it begins the process of loading installed kernel-level drivers. Obviously, to properly access the X Bus 128, the software architecture for the source measure switching system 100 must provide a driver compiled with the Linux kernel that serves this function. Thus when the kernel first calls the driver, it must do several things:
1) Inspect all slots to determine whether the slot contains a card or is empty.

2) Copy the file system image from detected, installed cards into the main RAM memory of the CPU. The driver performs this activity using the block memory-mapped transfer mode recently described.
3) Mount the transferred images as Linux RAM disks to the root file system, prefaced by a top directory indicating the slot from which the image originated. At this point, the contents of each card's flash memory appear as ordinary files.

Figure 5:
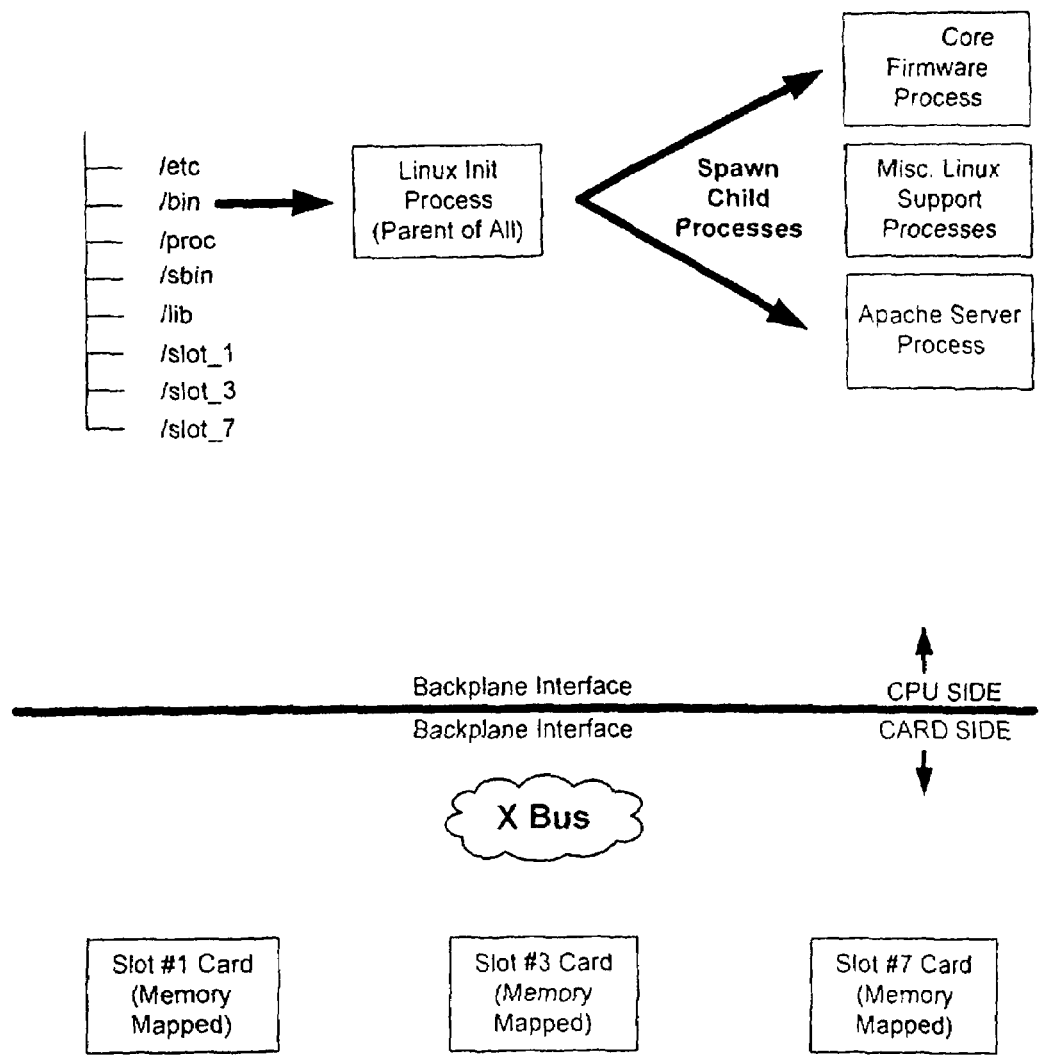
FIG. 5 shows a stage 2 initialization state of the test system in accordance with an embodiment of the invention.
Figure 6:
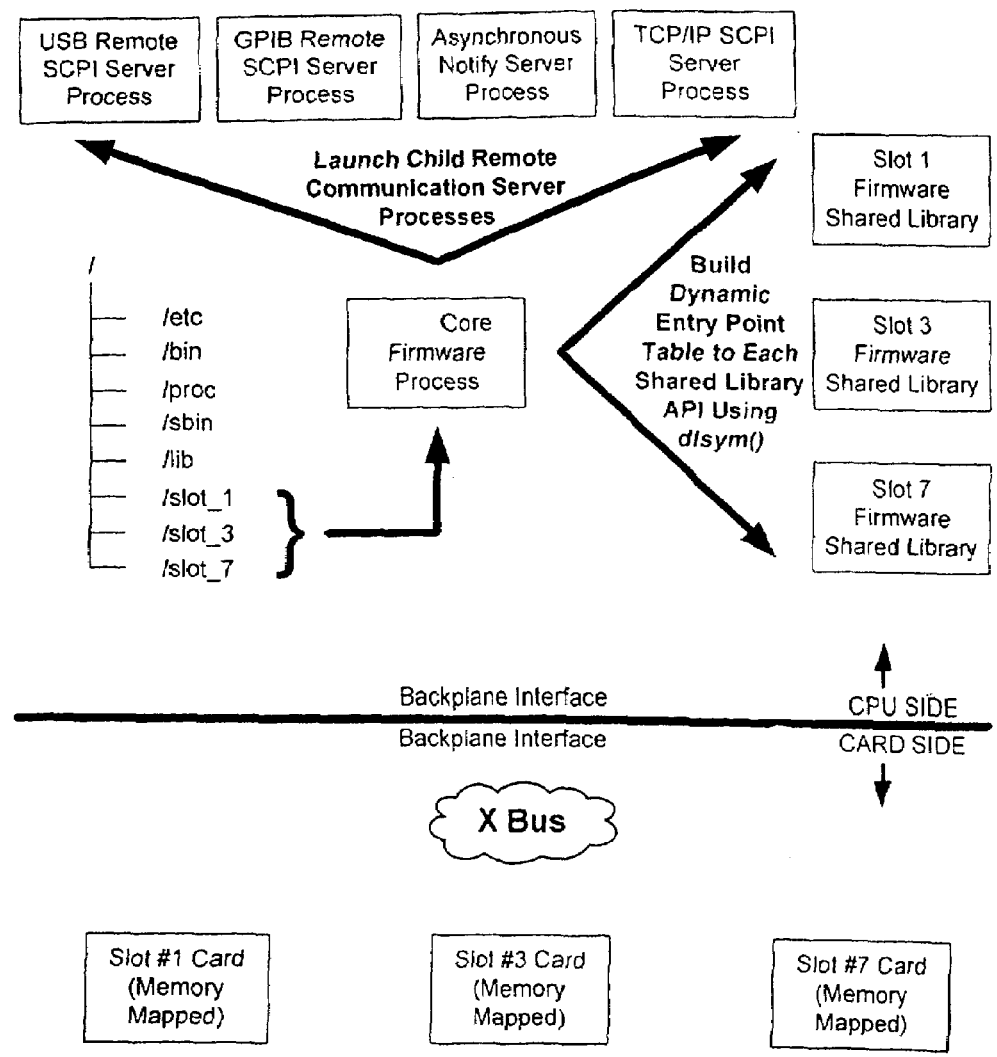
FIG. 6 shows a stage 3 initialization state of the test system in accordance with an embodiment of the invention.

Following this step, the Linux kernel starts the master init process which then in turn starts all other child processes such as the web server, the core source measure switching system firmware, and miscellaneous Linux support processes as FIG. 5 illustrates. When the core process begins execution it internally kicks off additional activities that technically mark the third stage of system initialization. Although the introduction briefly alluded to the fact that the software architecture somehow marries different pieces of firmware sourced by both the mainframe and installed cards, and it didn't elaborate how to accomplish this, FIG. 6 highlights how this is accomplished. With a file system mounted for each card present in the system, the core process need only look into the appropriate directory for the desired slot to locate the shared library firmware specific to that card.

Normally, libraries pose some unique challenges to software architecture planning. For starters, libraries under Linux fall into one of two major classes: static or dynamic. Static libraries are those with the ".a" suffix. This type of library must be re-linked to the main application anytime a change occurs within the library since the entry points for functions within the library are likely to move. The other challenge this library style creates occurs when multiple libraries with identical function names are loaded. This creates ambiguous references for the linker.

Clearly a static library arrangement is therefore not conducive to the source measure switching system architecture. Not only does the embedded environment lack native tool chains capable of re-linking the application to accommodate card libraries at startup, it is entirely possible that identical plug-in cards with identical libraries (and function names) will exist in the system. The second major library class under the Linux environment is dynamic in nature. This most common form today of this type of library is the shared dynamic library. A dynamic shared library typically carries a ".so" file suffix and can be found in the root file system library directory.

Unlike static libraries, dynamic shared libraries linked into an application do not get included with the application. Instead the linker makes references to the function names used in an application for which the Linux kernel dynamically determines the execution entry points when the application first starts. While this technique provides a significant improvement over static libraries, it still does not address what happens if an application needs multiple libraries that use a common API interface with identical function names.

Fortunately Linux provides a solution to this problem. Using the Linux dlsym( ) function call, an application that requires support from a particular library can determine a physical function pointer to the library's implementation of a desired function. Hence this erases ambiguity since the running application controls this behavior rather than a context-unaware dynamic linker, as highlighted in FIG. 6. The core architecture builds tables of function pointers at system startup that are referenced later in normal operation. The other key benefit to this technique is that changes or updates to the libraries built outside of the system do not present problems with legacy versions of the core firmware—provided that the basic API does not change.

The core process is also responsible for launching subsidiary child processes that handle remote communications to the outside world. Effectively a dedicated remote communication handling process exists for any major communication pathway into the instrument. Consequently all GPIB communications use the GPIB remote communication process, dynamic web-based accesses use the applet server remote communication process, and so forth.

Figure 7:
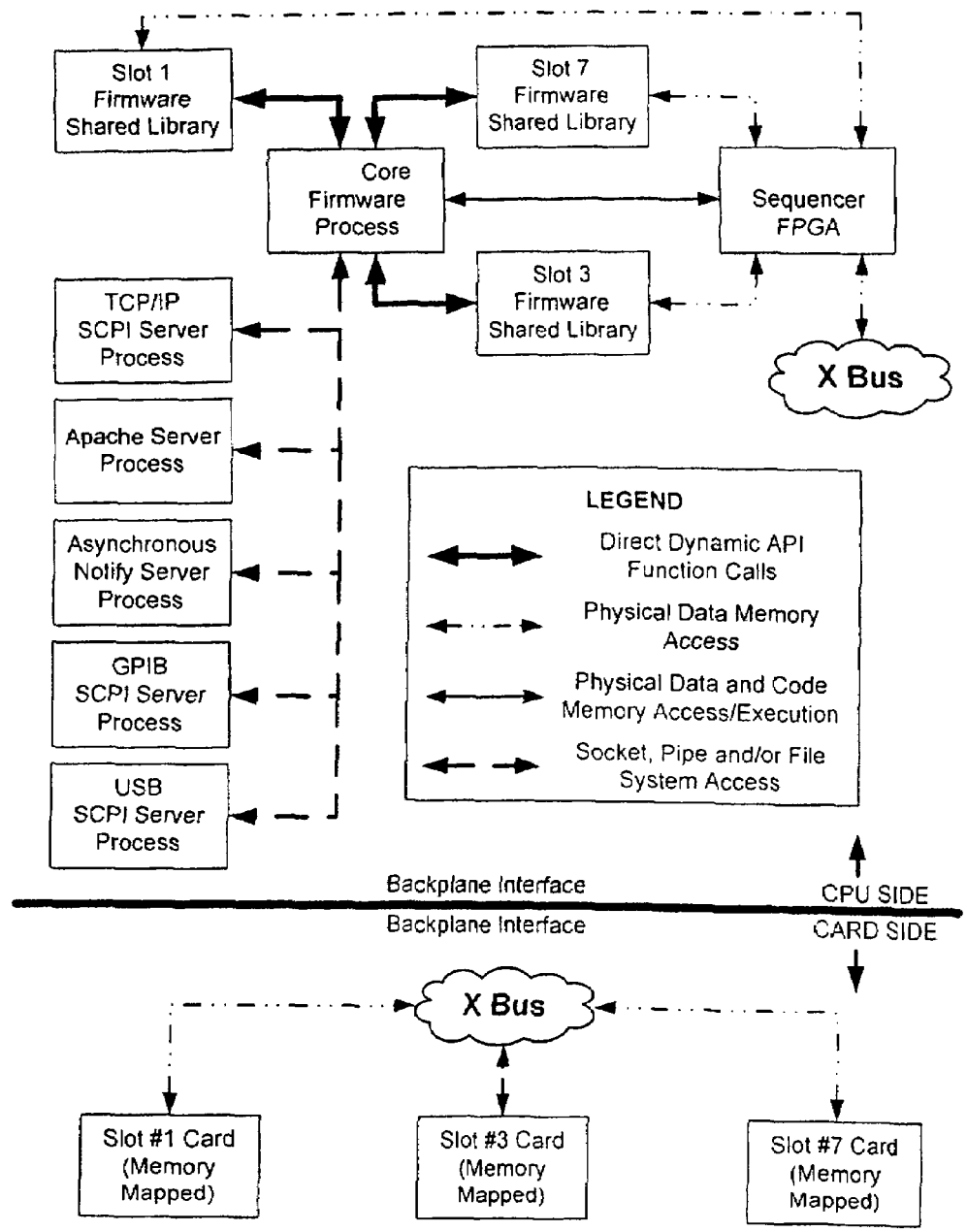
FIG. 7 shows a stage 4 initialization state of the test system in accordance with an embodiment of the invention.

The final stage of initialization for the source measure switching system 100 from a software architecture standpoint is shown in FIG. 7. With connectivity to individual card-specific libraries complete, the core firmware process now establishes sockets/pipes to remote communication servers, begins initialization activities required by user interfaces such as the display, knob, and keypad, and performs card-specific initialization activities. Once these activities are complete, the system is fully functional and ready to accept control input from the outside world.

External SCPI Message Transport

As FIG. 2 shows, SCPI-based communication plays an important role in the source measure switching system's user experience. This is a relatively easy-to-use and well-understood communication standard that many test and measurement companies adopted more than a decade ago for test instrumentation and measurement products.

While the SCPI communication standard lost some favor during the VXI days when hardware interfaces supported direct, high-speed register-based access, it has regained value in ethernet-driven products. Ethernet solutions (for which LXI embraces) are not conducive to direct register-based access. Therefore a SCPI or other message-based communication format must be adopted to facilitate communication. Since SCPI offers hardware interface agnostic behavior that works equally well with ethernet, USB, and GPIB, this time-tested standard has an important place in the source measure switching system's software architecture.

The SCPI standard mandates certain behaviors that drive the implementation of a single master SCPI message processor. Since the standard requires sequential behavior in command execution and proscribes parallel command execution paths, this works to the advantage of a product like the source measure switching system with multiple remote interfaces capable of operating concurrently. From a coding standpoint, implementing state machines based on sequential logic proves much simpler than those that have to account for parallel behavior. Each remote interface therefore only need be served in a first-in, first-out round-robin arrangement.

With a presumption that a single master parser in the core source measure switching system's firmware process shall handle command and query activity, other architecture-specific software details now come into focus. Described earlier and illustrated in FIG. 6, the core firmware process has the responsibility of loading ancillary support processes that act as remote communication servers to the outside world. While FIG. 6 serves a useful purpose in documenting the startup sequence for the source measure switching system, it does not reveal how a remote communication server process should look internally or how it should interact with the core firmware process. To fully appreciate the answer to this question, the software architecture must consider one additional detail.

Full compliance with the SCPI standard implies implementation of the IEEE-488.2 status reporting model. With the requirements established thus far, this software architecture implements a concept where one or more independent "virtual" instrument clients operate an obscured, single "real" instrument. Each virtual instrument in effect is self-contained and implements complete message and error queues, a response buffer, and IEEE-488.2 status registers. For interfaces that support multiple sessions like Ethernet, this approach easily allows each session to act as a virtual instrument also.

One issue results from this approach however. The IEEE-488.2 status reporting standard heralds from the days of GPIB—well before the idea of a single instrument talking to multiple computers and users was even possible. Unfortunately this standard creates some problems when applied to today's technology. The question about the significance of say the "PON" or power-on bit in the extended status register where multiple "virtual" instruments exist becomes grey—since this is technically related to the state of the real instrument and not the virtual instrument. Clearly in the present approach every time a new virtual instrument is opened the PON bit would be set which likely doesn't adhere with the intentions of the standard.

The source measure switching system is fully compliant with IEEE-488.2 status reporting model when the user sticks to using a single virtual client. If the user decides to use more than one virtual client, it is unreasonable to assume the source measure switching system should religiously comply with a standard that is impossible to satisfy because of future technical problems not foreseen when the standard first evolved.

Unlike previous source measure switching systems, where the main firmware required a certain amount of card awareness in one form or another, the present invention takes a different tack of distributed intelligence. It is possible using careful abstraction and compartmentalization to create two separate pieces of firmware that communicate with each other in a highly-generic sense without revealing or requiring any knowledge of how the other works internally.

If the abstraction and compartmentalization is divided cleanly between firmware servicing the main source measure switching system instrument and that provided by a particular card to service itself, the possibility of introducing new cards with support for previously undefined features becomes a reality. This can all be done without requiring main firmware updates, provided the role of the main firmware is limited to overall message routing, system supervision, and coordination activities between the outside world and individual cards present in the source measure switching system.

In practice, building the required level of abstraction and compartmentalization is tricky. For starters, dynamically bringing two or more completely different pieces of firmware together without recompilation and relinking necessitates the use of a sophisticated operating system to carefully manage the interactions through pipes, sockets, file systems, and/or dynamic libraries.

Trigger Router

The test system's trigger router is a fully configurable trigger input and trigger output routing matrix. The trigger router allows 16 trigger inputs. Twelve inputs are from twelve slots. Two inputs are from two Scan Sequencers, and two are from two external trigger inputs located on the rear panel. Every trigger input can be configured via 4 detection modes: active high, active low, level high, and level low. Every trigger input can be routed to every trigger output. Every trigger output can be configured for input to output delay, output edge active high or active low, output level high or level low, trigger pulse width, trigger repeat cycles (auto or input triggered), and trigger scan interval timer. Trigger scan interval can be configured up to 1276 hours. Any trigger output can also be configured to be triggered on single trigger, multiple triggers, or auto trigger if set.

Trigger Control Registers

Trigger router control requires a group of registers for each trigger input or output which are part of the trigger router. These are:
TROUTE(16-bit), TIN_ENB(1-bit), TOUT_ENB(1-bit), TIN_EDGE(1-bit), TIN_LEVEL(1-bit), TOUT_EDGE(1-bit), TOUT_LEVEL(1-bit), TRIGGER_ARM(1-bit), TRIGGER_AUTO(1-bit), TOUT_DELAY(16-bit), TOUT_WIDTH(16-bit), TOUT_DURA0(32-bit), TOUT_DURA1 (4-bit), and TOUT_REPEAT(16-bit) registers. These registers are fully explained on Tables 1.1 through 1.14. Trigger input and trigger output set up process is fully explained on Tables 1.15 through 1.18.

TABLE 1.1

TROUTE x Registers and Offset Address

| Register Name: | Trigger Input to Output Route Register x (TROUTE x) | | | | |
|---|---|---|---|---|---|
| CHIP SELECTS | CS6 | | | | |
| Base Address | 0x000000 | Offset Address | See Table 1 | Reset Value | 0x00000000 |
| Register Description: | Routes one or more trigger input to any trigger output. '0' - trigger input on the bit position is not routed to output. '1' - trigger input set by the bit position is routed to output. | | | Access | R/W |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| N/A | N/A | N/A | N/A | N/A | N/A | N/A | N/A | N/A | N/A | N/A | N/A | N/A | N/A | N/A | N/A | TIN2 | TIN1 | SCAN2 | SCAN1 | C12 | C11 | C10 | C9 | C8 | C7 | C6 | C5 | C4 | C3 | C2 | C1 |

TABLE 1.1-continued

TROUTE x Registers and Offset Address

| | | Trigger Input to Output Delay Register x (TROUTE x) | | | |
|---|---|---|---|---|---|
| Register | | | | Reset | |
| Bits | Name | Description | | Value | Access |
| 15:0 | Trigger Input Position | Routes one or more trigger input to trigger output x set by the bit position | | 0 | R/W |

| Registers | Offset Address |
|---|---|
| TTROUTE0 | 0x000000 |
| TTROUTE1 | 0x000004 |
| TTROUTE2 | 0x000008 |
| TTROUTE3 | 0x00000C |
| TTROUTE4 | 0x000010 |
| TTROUTE5 | 0x000014 |
| TTROUTE6 | 0x000018 |
| TTROUTE7 | 0x00001C |
| TTROUTE8 | 0x000020 |
| TTROUTE9 | 0x000024 |
| TTROUTE10 | 0x000028 |
| TTROUTE11 | 0x00002C |
| SCAN_ROUTE 1 | 0x000030 |
| SCAN_ROUTE 2 | 0x000034 |
| EXT_ROUTE1 | 0x000038 |

TABLE 1.2

TIN_ENB Registers and Offset Address

| Register Name: | TIN_ENB | | | | |
|---|---|---|---|---|---|
| CHIP SELECTS | CS6 | | | | |
| Base Address | 0x000000 | Offset Address | 0x001000 | Reset Value | 0x00000000 |
| Register Description: | Enables trigger input for the routing matrix. '1' - enable, '0' - disable. | | | Access | R/W |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| N/A | N/A | N/A | N/A | N/A | N/A | N/A | N/A | N/A | N/A | N/A | N/A | N/A | N/A | N/A | N/A | EXTIN2 | EXTIN1 | SCAN2 | SCAN1 | C11 | C10 | C9 | C8 | C7 | C6 | C5 | C4 | C3 | C2 | C1 | |

| | | TIN_ENB | | | |
|---|---|---|---|---|---|
| Register | | | | Reset | |
| Bits | Name | Description | | Value | Access |
| 15:14 | Tringger15_ENB:Trigger14_ENB | Enables external trigger input 2 and external trigger input 1 | | 0 | R/W |
| 13:12 | Trigger12_ENB:Trigger13_ENB | Enables scan sequencer 2 and scan sequencer 1 input | | 0 | R/W |
| 11:0 | Trigger11_ENB:Trigger0_ENB | Enable trigger input 12 down to 1 | | 0 | R/W |

TABLE 1.3

TIN_EDG Registers and Offset Address

| Register Name: | | | TIN_EDG | | | | |
|---|---|---|---|---|---|---|---|
| CHIP SELECTS | CS6 | | | | | | |
| Base Address | 0x000000 | Offset Address | 0x001004 | Reset Value | 0x00000000 | | |
| Register Description: | | Sets input detection level/edge mode: Level trigger or Edge trigger.<br>'0' - Level trigger, '1' - Edge trigger | | | Access | R/W | |

| 33 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| N/A | N/A | N/A | N/A | N/A | N/A | N/A | N/A | N/A | N/A | N/A | N/A | N/A | N/A | N/A | N/A | EXTIN2 | EXTIN1 | SCAN2 | SCAN1 | C12 | C11 | C10 | C9 | C8 | C7 | C6 | C5 | C4 | C3 | C2 | C1 |

| | | TIN_EDG | | |
|---|---|---|---|---|
| Register Bits | Name | Description | Reset Value | Access |
| 15:14 | TIN_EDG15:TTIN_EDG14 | Sets detection mode for external trigger input 2 and external trigger input 1 | 0 | R/W |
| 13:12 | TIN_EDG13:TIN_EDG12 | Sets detection mode scan sequencer 2 and scan sequencer 1 input | 0 | R/W |
| 11:0 | Trigger_EDG11:Trigger_EDG0 | Sets detection mode trigger input 12 down to 1 | 0 | R/W |

TABLE 1.4

TIN_LVL Registers and Offset Address

| Register Name: | | | TIN_LVL | | | | |
|---|---|---|---|---|---|---|---|
| CHIP SELECTS | CS6 | | | | | | |
| Base Address | 0x000000 | Offset Address | 0x001008 | Reset Value | 0x00000000 | | |
| Register Description: | | Sets input detection level after TIN_EDG register is set:<br>Level trigger mode:<br>'0' - level 0, '1' - level 1<br>Edge trigger mode:<br>'0' - falling edge, '1' - rising edge | | | Access | R/W | |

| 33 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| N/A | N/A | N/A | N/A | N/A | N/A | N/A | N/A | N/A | N/A | N/A | N/A | N/A | N/A | N/A | N/A | EXTIN2 | EXTIN1 | SCAN2 | SCAN1 | C12 | C11 | C10 | C9 | C8 | C7 | C6 | C5 | C4 | C3 | C2 | C1 |

| | | TIN_LVL | | |
|---|---|---|---|---|
| Register Bits | Name | Description | Reset Value | Access |
| 15:14 | TIN_LVL15:TIN_LVL14 | Sets detection mode for external trigger input 2 and external trigger input 1 | 0 | R/W |
| 13:12 | TIN_LVL13:TIN_LVL12 | Sets detection mode scan sequencer 2 and scan sequencer 1 input | 0 | R/W |

TABLE 1.4-continued

TIN_LVL Registers and Offset Address

| 11:0 | TIN_LVL11:TIN_LVL0 | Sets detection mode trigger input 12 down to 1 | 0 | R/W |
|---|---|---|---|---|

TABLE 1.5

TOUT_ENB Registers and Offset Address

| Register Name: | | | TOUT_ENB | | | | |
|---|---|---|---|---|---|---|---|
| CHIP SELECTS | | CS6 | | | | | |
| Base Address | | 0x000000 | Offset Address | 0x00100C | Reset Value | | 0x00000000 |
| Register Description: | | Enables trigger output '1' - enable, '0' - disable. | | | Access | | R/W |

| 33 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|
| N/A | N/A | N/A | N/A | N/A | N/A | N/A | N/A | N/A | N/A | N/A | N/A | N/A | N/A | N/A | N/A | N/A | EXT OUT1 | SCAN2 | SCAN1 | C12 | C11 | C10 | C9 | C8 | C7 | C6 | C5 | C4 | C3 | C2 | C1 |

| | | TOUT_ENB | | |
|---|---|---|---|---|
| Register Bits | Name | Description | Reset Value | Access |
| 14 | TOUT_ENB14 | Enables trigger output to the external trigger output1 | 0 | R/W |
| 13:12 | TOUT_ENB13:TOUT_ENB12 | Enables output to scan sequencer 2 and scan sequencer 1 | 0 | R/W |
| 11:0 | TOUT_ENB11:TOUT_ENB0 | Enable trigger output 12 down to 1 | 0 | R/W |

TABLE 1.6

TOUT_EDG Registers and Offset Address

| Register Name: | | | TOUT_EDG | | | | |
|---|---|---|---|---|---|---|---|
| CHIP SELECTS | | CS6 | | | | | |
| Base Address | | 0x000000 | Offset Address | 0x001010 | Reset Value | | 0x00000000 |
| Register Description: | | Sets output level/edge mode: Level trigger or Edge trigger '0' - Level trigger, '1' - Edge trigger | | | Access | | R/W |

| 33 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|
| N/A | N/A | N/A | N/A | N/A | N/A | N/A | N/A | N/A | N/A | N/A | N/A | N/A | N/A | N/A | N/A | N/A | EXTIN1 | SCAN2 | SCAN1 | C12 | C11 | C10 | C9 | C8 | C7 | C6 | C5 | C4 | C3 | C2 | C1 |

TABLE 1.6-continued

TOUT_EDG Registers and Offset Address

| | | | TOUT_EDG | |
|---|---|---|---|---|
| | Register | | Reset | |
| Bits | Name | Description | Value | Access |
| 14 | TOUT_EDG14 | Sets edge mode for external trigger output 1 | 0 | R/W |
| 13:12 | TOUT_EDG13:TOUT_EDG12 | Sets edge mode to output to scan sequencer 2 and scan sequencer 1 input | 0 | R/W |
| 11:0 | TOUT_EDG11:TOUT_EDG0 | Sets edge mode for trigger output 12 down to 1 | 0 | R/W |

TABLE 1.7

TOUT_LVL Registers and Offset Address

| Register Name: | TOUT_LVL | | | |
|---|---|---|---|---|
| CHIP SELECTS | CS6 | | | |
| Base Address | 0x000000 | Offset Address 0x001014 | Reset Value | 0x00000000 |
| Register Description: | Sets output level after TOUT_EDG register is set:<br>Level trigger mode:<br>'0' - Level 0, '1' - level 1<br>Edge trigger mode:<br>'0' - falling edge, '1' - rising edge | | Access | R/W |

| 33 | 2 | 2 | 2 | 2 | 2 | 2 | 2 | 2 | 2 | 2 | 1 | 1 | 1 | 1 | 1 | 1 | 1 | 1 | 1 | 1 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|---|---|---|
| 1 0 | 9 | 8 | 7 | 6 | 5 | 4 | 3 | 2 | 1 | 0 | 9 | 8 | 7 | 6 | 5 | 4 | 3 | 2 | 1 | 0 | 9 | 8 | 7 | 6 | 5 | 4 | 3 | 2 | 1 | 0 |
| N N // A A | N / A | N / A | N / A | N / A | N / A | N / A | N / A | N / A | N / A | N / A | N / A | N / A | N / A | N / A | N / A | EXT IN 1 | SCAN N 2 | SCAN N 1 | C 1 2 | C 1 1 | C 1 0 | C 9 | C 8 | C 7 | C 6 | C 5 | C 4 | C 3 | C 2 | C 1 |

| | | | TOUT_LVL | |
|---|---|---|---|---|
| | Register | | Reset | |
| Bits | Name | Description | Value | Access |
| 14 | TOUT_LVL14 | Sets level mode for external trigger input 1 | 0 | R/W |
| 13:12 | TOUT_LVL13:TOUT_LVL12 | Sets level mode for output to scan sequencer 2 and scan sequencer 1 | 0 | R/W |
| 11:0 | TOUT_LVL11:TOUT_LVL0 | Sets detection mode trigger output 12 down to 1 | 0 | R/W |

TABLE 1.8

TOUT_ARM Registers and Offset Address

| Register Name: | TOUT_ARM | | | |
|---|---|---|---|---|
| CHIP SELECTS | CS6 | | | |
| Base Address | 0x000000 | Offset Address 0x001018 | Reset Value | 0x00000000 |
| Register Description: | Trigger output state machine is ready after the TOUT_ARM is set.<br>Trigger output state machine is on standby after the | | Access | R/W |

TABLE 1.8-continued

TOUT_ARM Registers and Offset Address

TOUT_ARM is cleared.
'1' - arm, '0' - disarm.

| 33 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|
| N/A | N/A | N/A | N/A | N/A | N/A | N/A | N/A | N/A | N/A | N/A | N/A | N/A | N/A | N/A | N/A | EXTIN1 | SCAN2 | SCAN1 | C12 | C11 | C10 | C9 | C8 | C7 | C6 | C5 | C4 | C3 | C2 | C1 |

| | TOUT_ARM | | | |
|---|---|---|---|---|
| Register | | | Reset | |
| Bits | Name | Description | Value | Access |
| 14 | TOUT_ARM14 | Arms external trigger output 1 | 0 | R/W |
| 13:12 | TOUT_ARM13:TOUT_ARM12 | Arms output to scan sequencer 2 and scan sequencer 1 | 0 | R/W |
| 11:0 | TOUT_ARM11:TOUT_ARM0 | Arms trigger output 12 down to 1 | 0 | R/W |

TABLE 1.9

TOUT_AUTO Registers and Offset Address

| Register Name: | TOUT_AUTO | | | |
|---|---|---|---|---|
| CHIP SELECTS | CS6 | | | |
| Base Address | 0x000000 | Offset Address | 0x00101C | Reset Value | 0x00000000 |
| Register Description: | Sets automatic trigger output. Trigger output state machine is on auto trigger without any trigger input source once the corresponding bit is set (1). Trigger output state machine is triggered on external input sources once the corresponding bit is cleared (0). '1' - set, '0' - cleared. | | Access | R/W |

| 33 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|
| | | | | | | | | | | | | | | | | EXTIN1 | SCAN2 | SCAN1 | C12 | C11 | C10 | C9 | C8 | C7 | C6 | C5 | C4 | C3 | C2 | C1 |

| | TOUT_AUTO | | | |
|---|---|---|---|---|
| Register | | | Reset | |
| Bits | Name | Description | Value | Access |
| 14 | TOUT_AUTO14 | AUTO trigger input 1 | 0 | R/W |
| 13:12 | TOUT_AUTO13:TOUT_AUTO12 | AUTO output to scan sequencer 2 and scan sequencer 1 | 0 | R/W |
| 11:0 | TOUT_AUTO11:TOUT_AUTO0 | AUTO trigger output 12 down to 1 | 0 | R/W |

TABLE 1.10

TOUT_DELAY x
Registers and Offset Address

| Register Name: | Trigger Input to Output Delay Register x (TOUT_DELAYx) | | | |
|---|---|---|---|---|
| CHIP SELECTS | CS6 | | | |
| Base Address | 0x000000 | Offset Address: See Table 1 | Reset Value | 0x00000000 |
| Register Description: | Provides trigger input to trigger output delay in 1 usec increment for up to 4095 seconds. Min: 0 count => 0 μsec; Max: 4294967296 => 4295 sec. | | Access | R/W |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| D31 | D30 | D29 | D28 | D27 | D26 | D25 | D24 | D23 | D22 | D21 | D20 | D19 | D18 | D17 | D16 | D15 | D14 | D13 | D12 | D11 | D10 | D9 | D8 | D7 | D6 | D5 | D4 | D3 | D2 | D1 | D0 |

Trigger Input to Output Delay Register x (TOUT_DELAYx)

| Register Bits | Name | Description | Reset Value | Access |
|---|---|---|---|---|
| 31:0 | Delay Counter | Min: 0 count => 0 μsec; Max: 4294967296 => 4295 sec. | 0 | R/W |

| Registers | Offset Address |
|---|---|
| TOUT_DELAY0 | 0x002000 |
| TOUT_DELAY1 | 0x002004 |
| TOUT_DELAY2 | 0x002008 |
| TOUT_DELAY3 | 0x00200C |
| TOUT_DELAY4 | 0x002010 |
| TOUT_DELAY5 | 0x002014 |
| TOUT_DELAY6 | 0x002018 |
| TOUT_DELAY7 | 0x00201C |
| TOUT_DELAY8 | 0x002020 |
| TOUT_DELAY9 | 0x002024 |
| TOUT_DELAY10 | 0x002028 |
| TOUT_DELAY11 | 0x00202C |
| TSCAN_DELAY 1 | 0x002030 |
| TSCAN_DELAY 2 | 0x002034 |
| TEXTOUT_DELAY 1 | 0x002038 |

TABLE 1.11

TOUT_WIDTH x
Registers and Offset Address

| Register Name: | Trigger Output Pulse Width Register x (TOUT_WIDTH x) | | | |
|---|---|---|---|---|
| CHIP SELECTS | CS6 | | | |
| Base Address | 0x000000 | Offset Address: See Table 1 | Reset Value | 0x00000001 |
| Register Description: | Controls the trigger pulse width for up to 65536 μsec. Min: 1 => 1 μsec; Max 65536 => 65536 μsec. | | Access | R/W |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| N/A | N/A | N/A | N/A | N/A | N/A | N/A | N/A | N/A | N/A | N/A | N/A | N/A | N/A | N/A | N/A | D15 | D14 | D13 | D12 | D11 | D10 | D9 | D8 | D7 | D6 | D5 | D4 | D3 | D2 | D1 | D0 |

TABLE 1.11-continued

TOUT_WIDTH x
Registers and Offset Address

Trigger Output WIDTH Register x (TOUT_WIDTHx)

| Register | | | Reset | |
|---|---|---|---|---|
| Bits | Name | Description | Value | Access |
| 31:0 | Delay Counter | Min: 1 => 1 μsec; Max 65536 => 65536 μsec. | 0 | R/W |

| Registers | Offset Address |
|---|---|
| TOUT_WIDTH0 | 0x003000 |
| TOUT_WIDTH1 | 0x003004 |
| TOUT_WIDTH2 | 0x003008 |
| TOUT_WIDTH3 | 0x00300C |
| TOUT_WIDTH4 | 0x003010 |
| TOUT_WIDTH5 | 0x003014 |
| TOUT_WIDTH6 | 0x003018 |
| TOUT_WIDTH7 | 0x00301C |
| TOUT_WIDTH8 | 0x003020 |
| TOUT_WIDTH9 | 0x003024 |
| TOUT_WIDTH10 | 0x003028 |
| TOUT_WIDTH11 | 0x00302C |
| TSCAN_WIDTH 1 | 0x003030 |
| TSCAN_WIDTH 2 | 0x003034 |
| TEXTOUT_WIDTH 1 | 0x003038 |

TABLE 1.12

TOUT_DURA0 x
Registers and Offset Address

| Register Name: | Trigger Output Scan Interval Lower Long Word x (TOUT_DURA0 x) | | | | |
|---|---|---|---|---|---|
| CHIP SELECTS | CS6 | | | | |
| Base Address | 0x000000 | Offset Address | See Table 1 | Reset Value | 0x0000000 |
| Register Description: | In combination of TOUT_DURA1 x for controlling total trigger duration. | | | Access | R/W |

| 33 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|
| DD33 10 | D29 | D28 | D27 | D26 | D25 | D24 | D23 | D22 | D21 | D20 | D19 | D18 | D17 | D16 | D15 | D14 | D13 | D12 | D11 | D10 | D9 | D8 | D7 | D6 | D5 | D4 | D3 | D2 | D1 | D0 |

Trigger Output Scan Interval Lower Long Word x (TOUT_DURA0 x)

| Register | | | Reset | |
|---|---|---|---|---|
| Bits | Name | Description | Value | Access |
| 31:0 | Duration Counter Lower 32-bit | 32-BIT Value. Min count: 0 => 0; Max count: 4294967296 counts. | 0 | R/W |

| Registers | Offset Address |
|---|---|
| TOUT_DURA0_0 | 0x004000 |
| TOUT_DURA0_1 | 0x004004 |
| TOUT_DURA0_2 | 0x004008 |
| TOUT_DURA0_3 | 0x00400C |
| TOUT_DURA0_4 | 0x004010 |
| TOUT_DURA0_5 | 0x004014 |
| TOUT_DURA0_6 | 0x004018 |
| TOUT_DURA0_7 | 0x00401C |
| TOUT_DURA0_8 | 0x004020 |
| TOUT_DURA0_9 | 0x004024 |
| TOUT_DURA0_10 | 0x004028 |
| TOUT_DURA0_11 | 0x00402C |
| TSCAN_DURA0_1 | 0x004030 |

TABLE 1.12-continued

TOUT_DURA0 x
Registers and Offset Address

| | |
|---|---|
| TSCAN_DURA0_2 | 0x004034 |
| TEXTOUT_DURA0_1 | 0x004038 |

TABLE 1.13

TOUT_DURA1 x
Registers and Offset Address

| Register Name: | Trigger Output Scan Interval Upper Nibble x (TOUT_DURA1 x) | | | | |
|---|---|---|---|---|---|
| CHIP SELECTS | CS6 | | | | |
| Base Address | 0x000000 | Offset Address | See Table 1 | Reset Value | 0x0000000 |
| Register Description: | In combination of TOUT_DURA0 x for controlling total trigger duration. | | | Access | R/W |

| 33 | 2 | 2 | 2 | 2 | 2 | 2 | 2 | 2 | 2 | 2 | 1 | 1 | 1 | 1 | 1 | 1 | 1 | 1 | 1 | 1 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|---|---|---|
| 1 0 | 9 | 8 | 7 | 6 | 5 | 4 | 3 | 2 | 1 | 0 | 9 | 8 | 7 | 6 | 5 | 4 | 3 | 2 | 1 | 0 | 9 | 8 | 7 | 6 | 5 | 4 | 3 | 2 | 1 | 0 |
| N N // A A | N / A | N / A | N / A | N / A | N / A | N / A | N / A | N / A | N / A | N / A | N / A | N / A | N / A | N / A | N / A | N / A | N / A | N / A | N / A | N / A | N / A | N / A | N / A | N / A | N / A | N / A | D 3 | D 2 | D 1 | D 0 |

Trigger Output Scan Interval Upper Nibble x (TOUT_DURA1 x)

| Register Bits | Name | Description | Reset Value | Access |
|---|---|---|---|---|
| 3:0 | Duration Counter Higher 4-bit | 4-BIT Value: Min: 0; Max: 15. | 0 | R/W |

| Registers | Offset Address |
|---|---|
| TOUT_DURA1_0 | 0x005000 |
| TOUT_DURA1_1 | 0x005004 |
| TOUT_DURA1_2 | 0x005008 |
| TOUT_DURA1_3 | 0x00500C |
| TOUT_DURA1_4 | 0x005010 |
| TOUT_DURA1_5 | 0x005014 |
| TOUT_DURA1_6 | 0x005018 |
| TOUT_DURA1_7 | 0x00501C |
| TOUT_DURA1_8 | 0x005020 |
| TOUT_DURA1_9 | 0x005024 |
| TOUT_DURA1_10 | 0x005028 |
| TOUT_DURA1_11 | 0x00502C |
| TSCAN_DURA1_1 | 0x005030 |
| TSCAN_DURA1_2 | 0x005034 |
| TEXTOUT_DURA1_1 | 0x005038 |

Notes:
TOUT_DURA is equivalent to the scan interval and is formed by combining TOUT_DURA1 & TOUT_DURA0 => 36-bit. Max count: 68719476736 => 191.88 hours with step-size of 10 μsec.

TABLE 1.14

TREPEAT0_x Registers
and Offset Address

| Register Name: | Trigger Output Repeat Counter Register x (TREPEAT_x) | | | | |
|---|---|---|---|---|---|
| CHIP SELECTS | CS6 | | | | |
| Base Address | 0x000000 | Offset Address | See Table 1 | Reset Value | 0x0000000 |
| Register Description: | Sets the trigger output to detect trigger input or auto output for repetition cycles set by this registers. 16-bit | | | Access | R/W |

TABLE 1.14-continued

TREPEAT0_x Registers
and Offset Address

| | | | | | | | | | | | | | | | | | | | | counter | | | | | | | | | | | | | |
|---|---|---|---|---|---|---|---|---|---|---|---|---|---|---|---|---|---|---|---|---|---|---|---|---|---|---|---|---|---|---|---|---|---|
| 3 | 3 | 2 | 2 | 2 | 2 | 2 | 2 | 2 | 2 | 2 | 2 | 1 | 1 | 1 | 1 | 1 | 1 | 1 | 1 | 1 | 1 | 0 | 0 | 0 | 0 | 0 | 0 | 0 | 0 | 0 | 0 | | |
| 1 | 0 | 9 | 8 | 7 | 6 | 5 | 4 | 3 | 2 | 1 | 0 | 9 | 8 | 7 | 6 | 5 | 4 | 3 | 2 | 1 | 0 | 9 | 8 | 7 | 6 | 5 | 4 | 3 | 2 | 1 | 0 | | |
| N | N | N | N | N | N | N | N | N | N | N | N | N | N | N | N | D | D | D | D | D | D | D | D | D | D | D | D | D | D | D | D | | |
| / | / | / | / | / | / | / | / | / | / | / | / | / | / | / | / | 1 | 1 | 1 | 1 | 1 | 1 | 9 | 8 | 7 | 6 | 5 | 4 | 3 | 2 | 1 | 0 | | |
| A | A | A | A | A | A | A | A | A | A | A | A | A | A | A | A | 5 | 4 | 3 | 2 | 1 | 0 | | | | | | | | | | | | |

| Trigger Output Repeat Count Register x (REPEAT_x) | | | | |
|---|---|---|---|---|
| Register | | | Reset | |
| Bits | Name | Description | Value | Access |
| 15:0 | Repeat Counter 16-bit | 16-bit. Min: 1 count; Max 65536 counts; | 1 | R/W |

| Registers | Offset Address |
|---|---|
| TREPEAT0_0 | 0x006000 |
| TREPEAT0_1 | 0x006004 |
| TREPEAT0_2 | 0x006008 |
| TREPEAT0_3 | 0x00600C |
| TREPEAT0_4 | 0x006010 |
| TREPEAT0_5 | 0x006014 |
| TREPEAT0_6 | 0x006018 |
| TREPEAT0_7 | 0x00601C |
| TREPEAT0_8 | 0x006020 |
| TREPEAT0_9 | 0x006024 |
| TREPEAT0_10 | 0x006028 |
| TREPEAT0_11 | 0x00602C |
| TSCAN_REPEAT_1 | 0x006030 |
| TSCAN_REPEAT_2 | 0x006034 |
| TEXTREPEAT_1 | 0x006038 |

Trigger Input and Output Configuration Process

Figure 8:
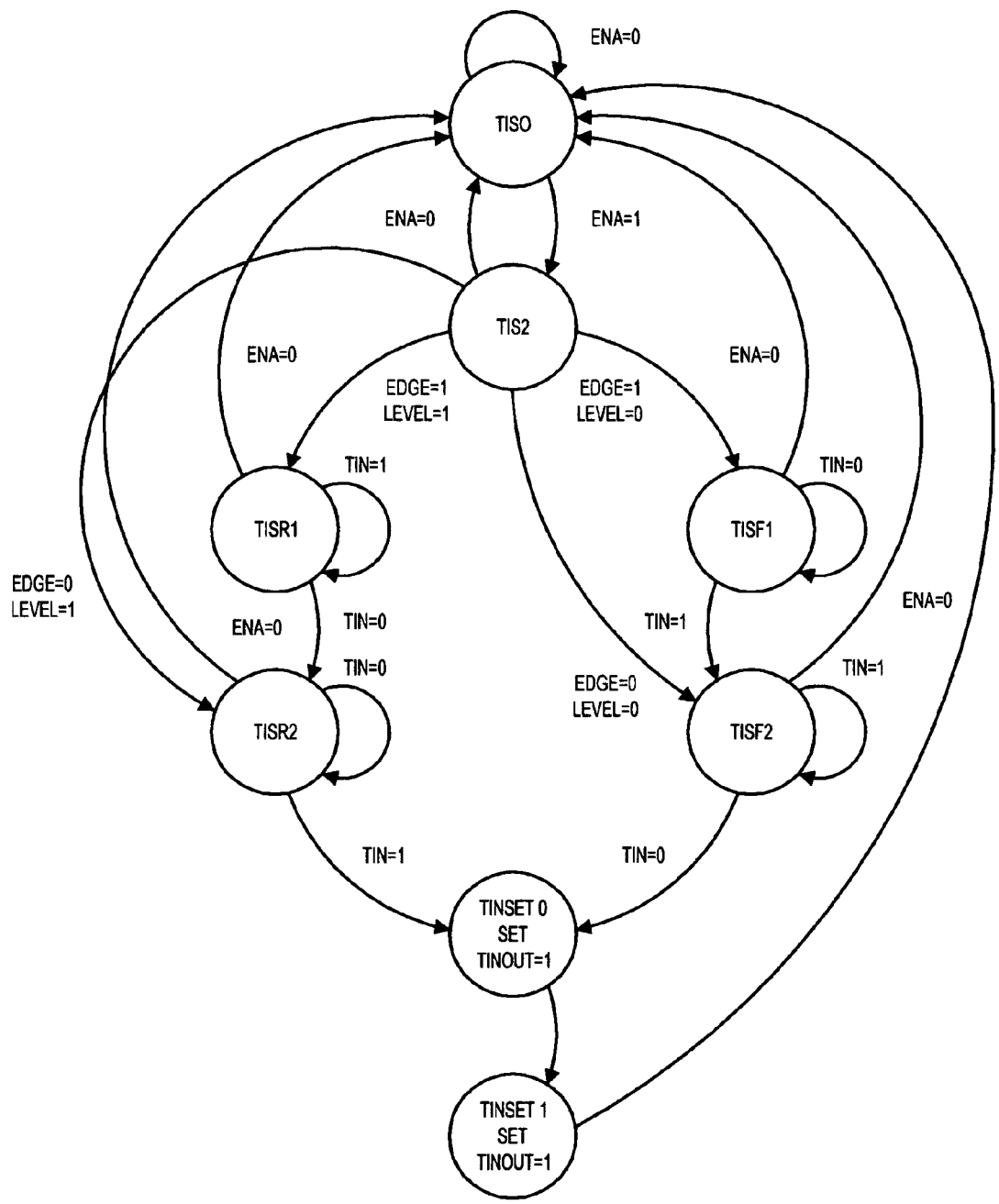
FIG. 8 shows a trigger input flow diagram in accordance with an embodiment of the invention.

FIG. 8 shows the flow of the trigger input configuration process. The settings of the trigger input and output are sequenced in the following manner:

TABLE 1.15

Trigger Input Configuration Process

| Registers Write | Notes |
|---|---|
| TIN_ENB | Enables Trigger input x |
| TIN_EDG | Sets edge or level for trigger input |
| TIN_LVL | Sets input to '0' or '1' for level trigger, falling or rising edge for edge trigger. |

Figure 9:
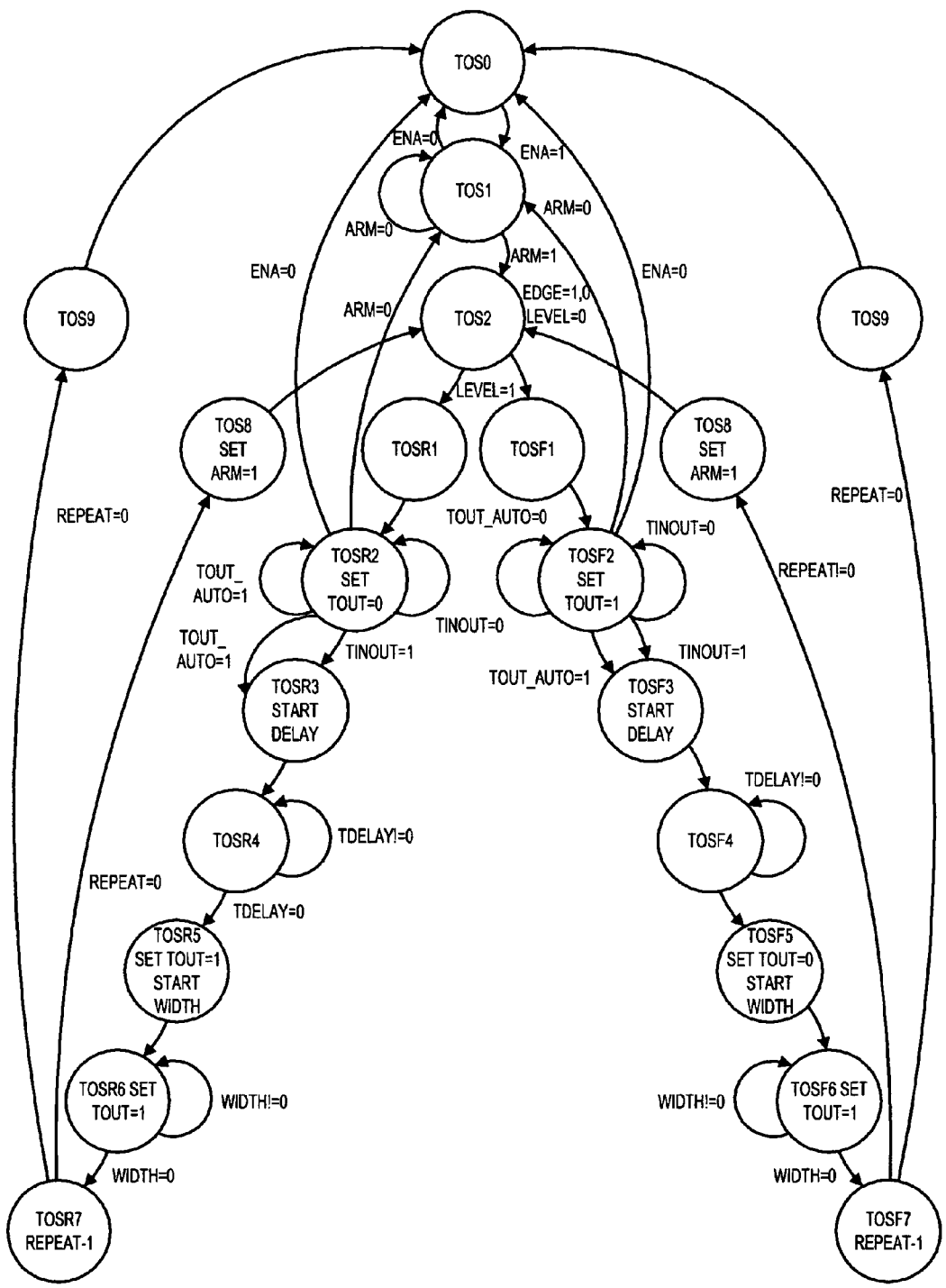
FIG. 9 shows a trigger output flow diagram in accordance with an embodiment of the invention.

Then the trigger output can be configured individually as illustrated by the flow diagram in FIG. 9.

TABLE 1.16

Trigger Output Configuration Process

| Registers Write | Notes |
|---|---|
| TOUT_ENB | Enables configuration for trigger output |
| TOUT_EDG | Sets Edge or level mode for output |
| TOUT_LVL | Sets output to level '0' or '1' with level mode, Falling or rising edge with edge mode. |
| TROUTE_x | Routes any one or more trigger input to trigger output x |
| TOUT_DELAY_x | Sets trigger input to trigger output delay for trigger output #x |
| TOUT_WIDTH x | Sets output pulse width to trigger output #x |

TABLE 1.16-continued

Trigger Output Configuration Process

| Registers Write | Notes |
|---|---|
| TOUT_DURA0 x | Sets lower long word of scan interval register for trigger output #x (trigger input to output lock out) |
| TOUT_DURA1 x | Sets higher 4-bit of scan interval for trigger output #x |
| TREPEAT x | Sets trigger output #x repeat count |
| TOUT_AUTO | Sets trigger output #x to auto |
| TOUT_ARM | Arms trigger output #x |

Trigger Input and Output by Examples

Figure 10:
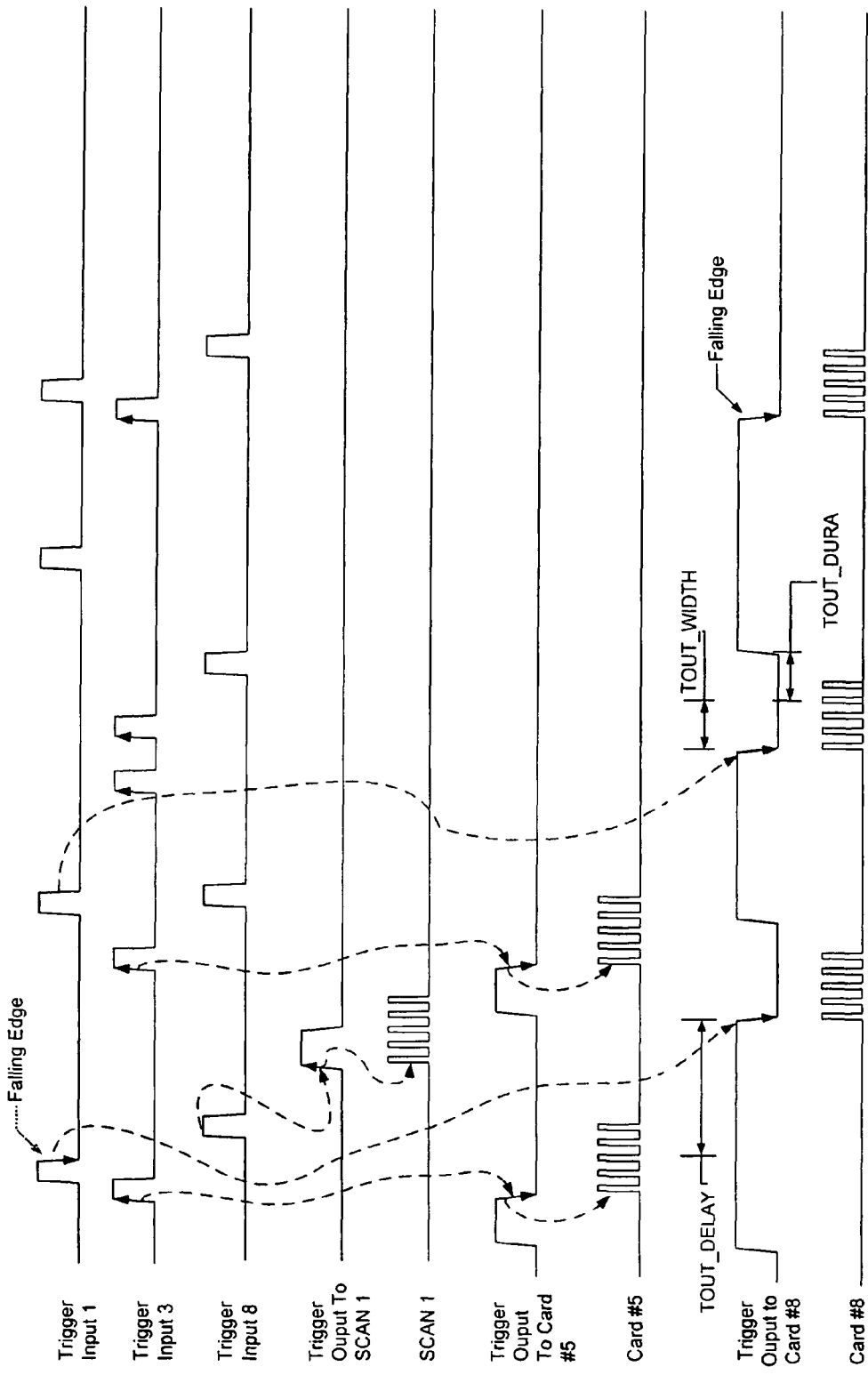
FIG. 10 shows a diagram for multiple independent trigger configurations in accordance with an embodiment of the invention.
Figure 11:
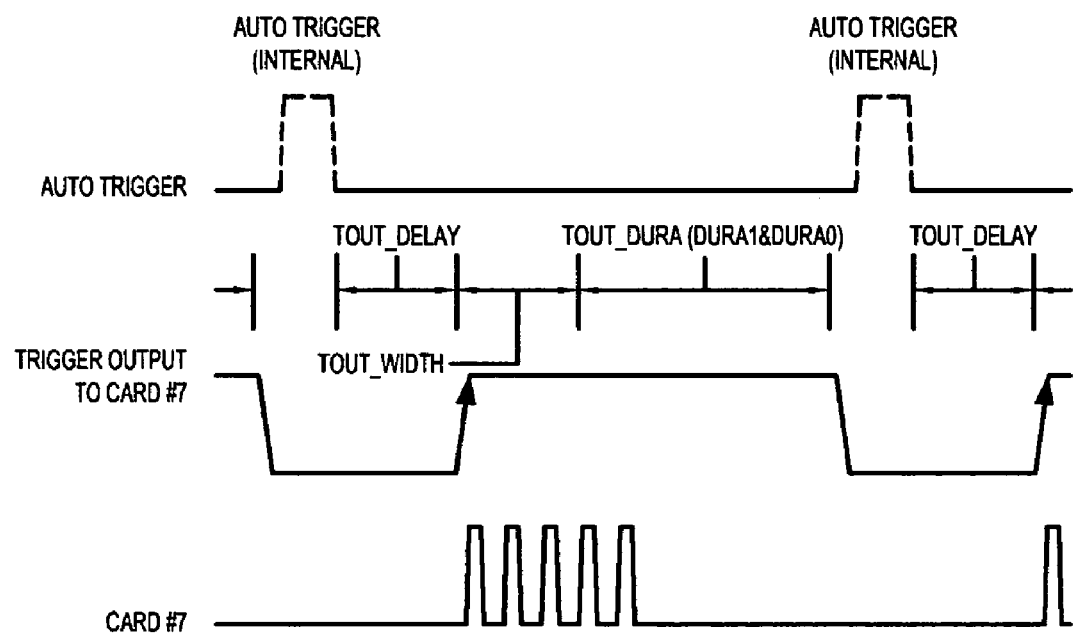
FIG. 11 shows a diagram of an auto trigger in accordance with an embodiment of the invention.

Trigger configurations can be best illustrated by examples As shown in FIGS. 10 and 11, trigger input #1 is detected on the falling edge, trigger input #3 is detected on the rising edge, and trigger input #8 is detected on level '1' (level high). Trigger output to card #5 is set to be triggered on trigger input #3 twice. The trigger output is configured to as falling edge. The trigger input to output delay is set to 43981 μsec. The trigger pulse width is 2099 μsec. The trigger duration timer is set at 0.40960 sec. Auto mode is off.

Trigger output to card #7 is set to auto-triggered and be repeated 5 times. The trigger output is configured to as rising edge. The trigger output delay is at 15.663 sec. The trigger pulse width is 2357 μsec. The trigger scan interval timer is set at 0.45056 sec.

Trigger output to card #8 is set to be triggered on trigger input #1 three times. The trigger output is configured to as rising edge. The trigger input to output delay is set to 15.663 sec. The trigger pulse width is 2099 μsec. The trigger scan interval timer is set at 0.53248 sec. Auto mode is off.

Trigger output to scan #1 is set to be triggered on trigger input #8 on single shot. The trigger output is configured to as rising edge. The trigger input to output delay is set to 0 sec. The trigger pulse width is 1792 μsec. The trigger scan interval timer is set at 0. Auto mode is off.

TABLE 1.17

Trigger Input Configuration Process by Examples

| Registers Write | Example | Notes |
|---|---|---|
| TIN_ENB | 0x00000085 | Enables Trigger input 1, 3, and 8 for configurations |
| TIN_EDG | 0x00000085 | Input 1, 3 edge, Input 8 level |
| TIN_LVL | 0x00000084 | Input 1 falling edge<br>Input 3 rising edge<br>Input 8 level high |

Then the trigger output can be configured individually.

TABLE 1.18

Trigger Output Configuration Process by Examples

| Registers Write | Example | Notes |
|---|---|---|
| TOUT_ENB | 0x00002070 | Enables output to #5, 7, 8, and scan 1 for configuration |
| TOUT_EDG | 0x000010D0 | Output 5, 7, 8, Scan 1 Edge |
| TOUT_LVL | 0x00003040 | Output 5 level '0'<br>Output 7 rising edge<br>Output 8 falling edge<br>Scan 1 rising edge |
| TROUTE_4 | 0x00000002 | Trigger input #3 routed to trigger output #5 |
| TROUTE_6 | 0x00000000 | Trigger input #7 set to auto trigger |
| TROUTE_7 | 0x00000001 | Trigger input #1 routed to trigger output #8 |
| TROUTE_13 | 0x00000080 | Trigger input #8 routed to scan #1 |
| TOUT_DELAY_4 | 0x0000ABCD | Sets output # 5 delay (43981 μsec) |
| TOUT_DELAY_6 | 0x000000EF | Sets output #7 delay (236 μsec) |
| TOUT_DELAY_7 | 0x00EF0000 | Sets output #8 delay (0 sec) |
| TOUT_DELAY_13 | 0x00000000 | Sets output scan 1 delay (15.663 sec) |
| TOUT_WIDTH4 | 0x00000833 | Sets output #5 width (2099 μsec) |
| TOUT_WIDTH6 | 0x00000833 | Sets output #7 width (2099 μsec) |
| TOUT_WIDTH7 | 0x00000935 | Sets output #8 width (2357 μsec) |
| TOUT_WIDTH13 | 0x00000700 | Sets output scan1 width (1792 μsec) |
| TOUT_DURA0_4 | 0x0000A000 | Sets Trigger scan interval #5 (0.40960 sec) |
| TOUT_DURA0_6 | 0x0000D000 | Sets Trigger scan interval #7 (0.53248 sec) |
| TOUT_DURA0_7 | 0x0000B000 | Sets Trigger scan interval #8 (0.45056 sec) |
| TOUT_DURA0_13 | 0x00000000 | Sets Trigger scan interval #13 (0 sec) |
| TOUT_DURA1_4 | 0x00000000 | |
| TOUT_DURA1_6 | 0x00000000 | |
| TOUT_DURA1_7 | 0x00000000 | |
| TOUT_DURA1_13 | 0x00000000 | |
| TREPEAT_4 | 0x00000002 | Sets output #5 repeat count (2 times) |
| TREPEAT_6 | 0x00000005 | Sets output #7 repeat count (5 times) |
| TREPEAT_7 | 0x00000003 | Sets output #8 repeat count (3 times) |
| TREPEAT_13 | 0x00000001 | Sets output to scan 1 single shot |
| TOUT_AUTO | 0x00000040 | Sets output #7 to auto trigger |
| TOUT_ARM | 0x00002070 | Readies trigger input for trigger output to #5, 7, 8, and scan 1. |

Figure 12:
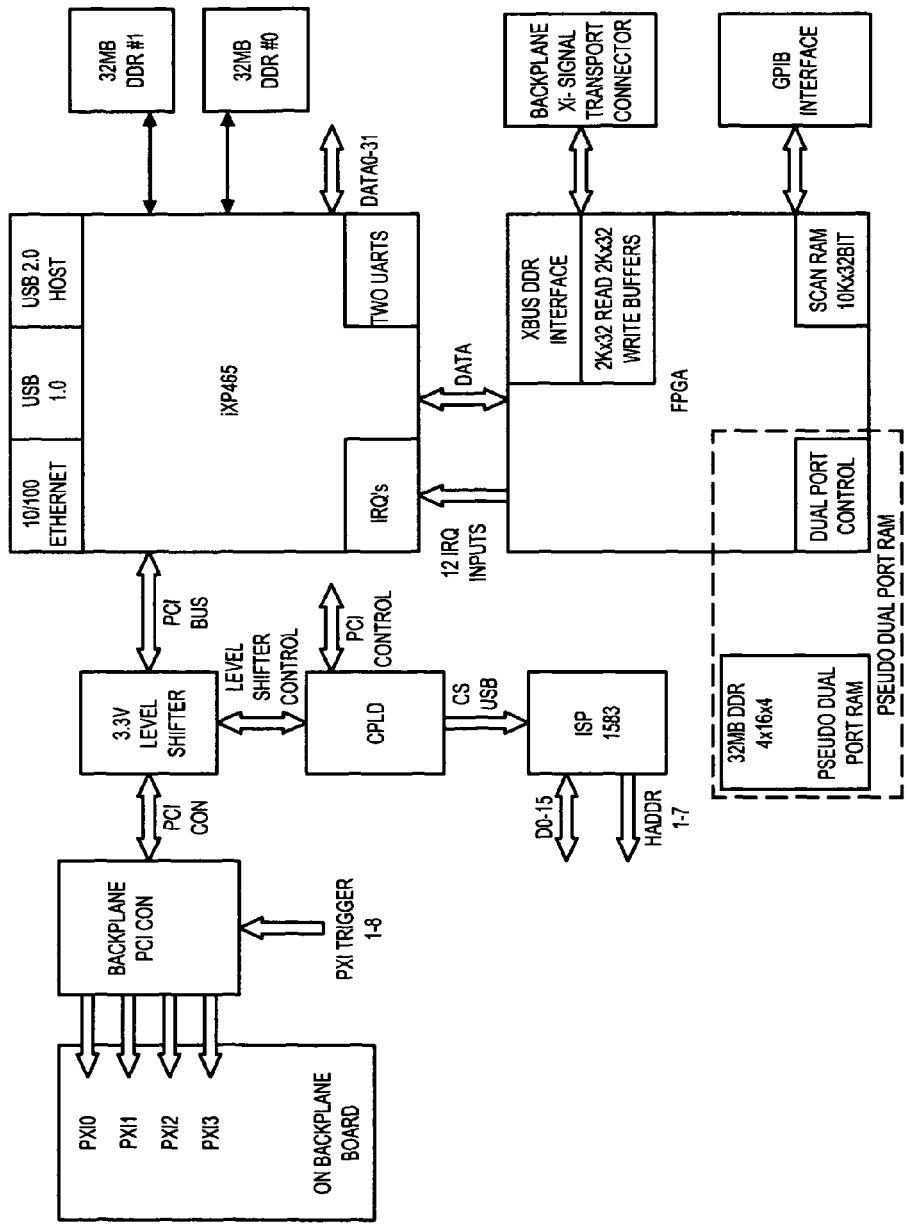
FIG. 12 shows a detailed block diagram of the test system in accordance with an embodiment of the invention.
Figure 13:
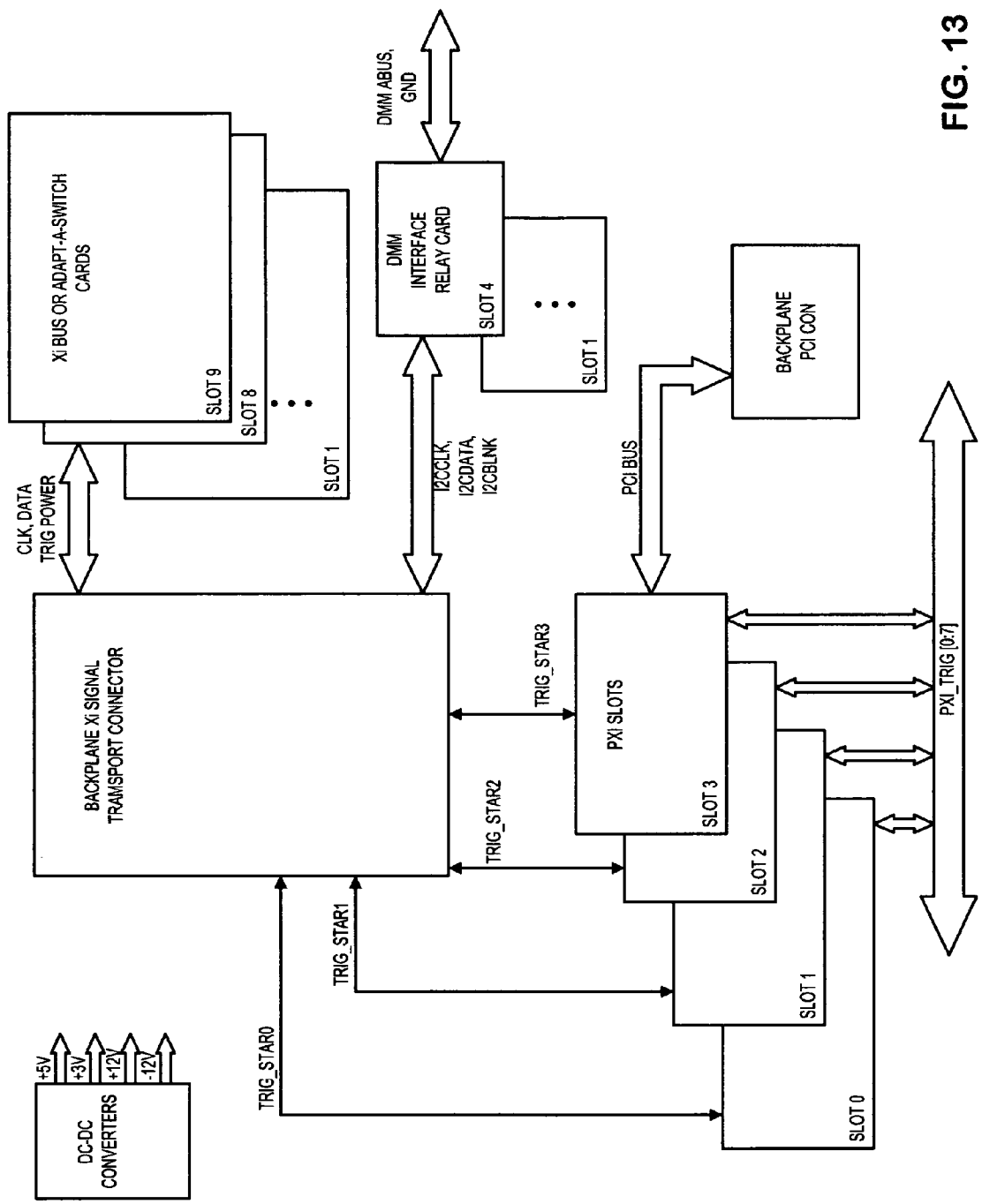
FIG. 13 shows a backplane board block diagram of the test system in accordance with an embodiment of the invention.
Figure 14:
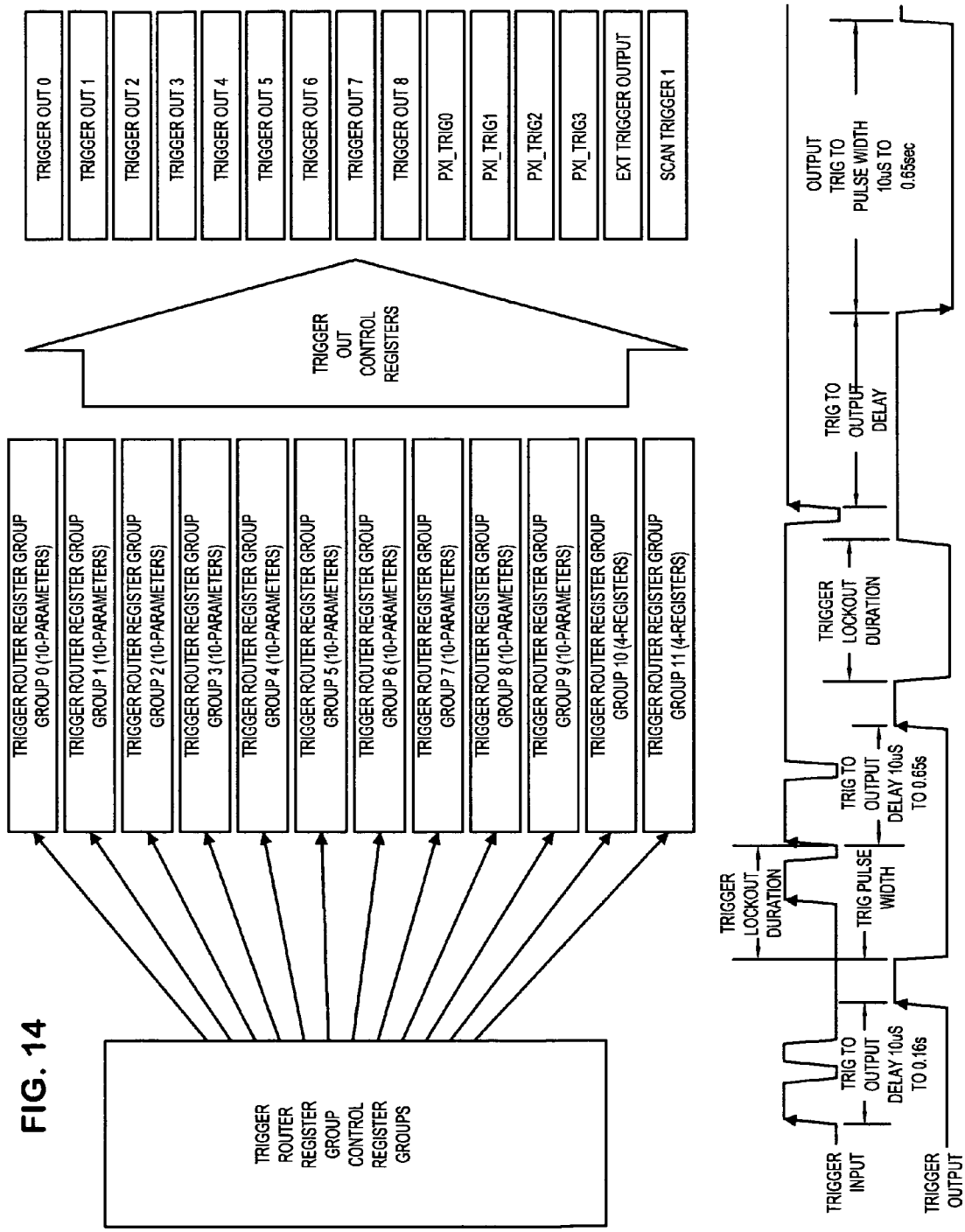
FIG. 14 shows a diagram of a trigger circuitry in accordance with an embodiment of the invention.

FIG. 12 shows a detailed block diagram of a test system in accordance with an embodiment of the invention, while FIG. 13 highlights a block diagram of the backplane board for test system 100. In FIG. 14 a diagram of a trigger circuit for use in test system 100 is shown and FIG. 15 shows a trigger router in accordance with an embodiment of the invention.

Figure 15:
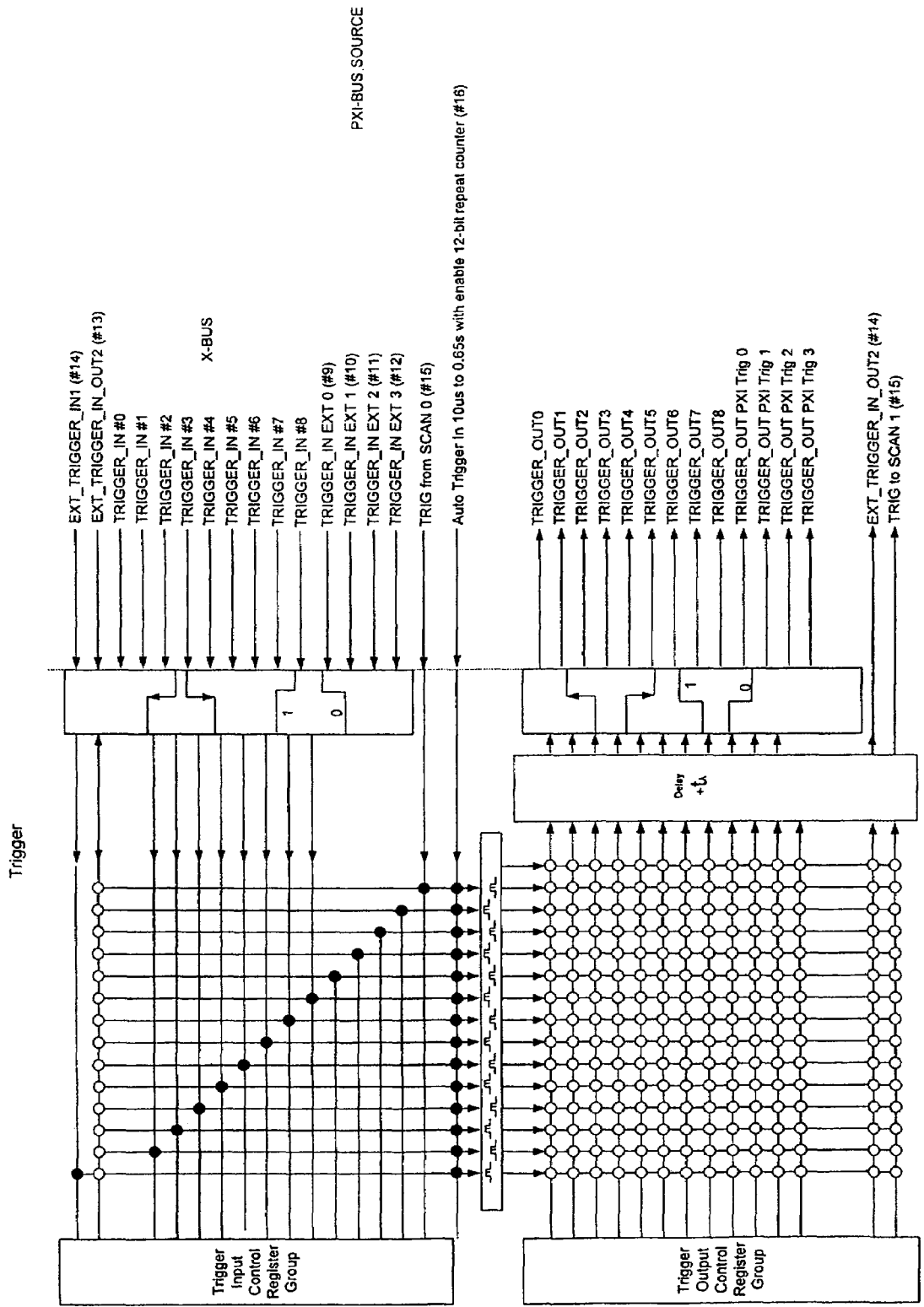
FIG. 15 shows a trigger router matrix in accordance with an embodiment of the invention.

The trigger router shown in FIG. 15 shown in FIG. 15 includes a plurality of trigger input ports and a plurality of trigger output ports. The plurality of trigger input ports are coupled to the X-bus and the PXI-bus sources as well as external triggers and a trigger from a SCAN. Coupled to the plurality of trigger input ports is a programmable input sensitivity control circuit used for independently programming the trigger sensitivity for each of the plurality of input triggers for positive-edge sensitivity, negative-edge sensitivity, high state sensitivity or low state sensitivity. Coupled to the plurality of output ports is a programmable output sensitivity control circuit for independently programming the trigger sensitivity of each of the plurality of output triggers for positive-edge sensitivity, negative-edge sensitivity, high state sensitivity or low state sensitivity. The trigger router shown in FIG. 15 is preferably located within the sequencer (sequence engine) which in an embodiment comprises a Field Programmable Gate Array (FPGA).

As shown in FIG. 15, a delay circuit can be used to delay signals flowing from the trigger router matrix to the plurality of output ports. Show on the left hand side of FIG. 15 is a group of trigger input control registers coupled to the input side of the trigger router matrix and a group of trigger output control registers coupled to the output portion of the trigger router matrix. These input and output control registers have been previously described above. Also shown are multiple external trigger inputs, an auto trigger input on the input side as well as an external trigger output and a trigger to scan line on the output side. The trigger matrices on the input and output sides can be designed using relays or other well known switching elements in order to allow any one or more of the inputs to interconnect with one or more of the outputs.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A trigger router, comprising:
    a plurality of input ports for receiving a plurality of input triggers;
    a plurality of output ports for outputting a plurality of output triggers;
    a programmable input sensitivity control circuit coupled to the plurality of input ports for independently programming the trigger sensitivity for each of the plurality of input triggers for positive-edge sensitivity, negative-edge sensitivity, high state sensitivity or low state sensitivity;
    a programmable output sensitivity control circuit coupled to the plurality of output ports for independently programming the trigger sensitivity of each of the plurality of output triggers for positive-edge sensitivity, negative-edge sensitivity, high state sensitivity or low state sensitivity;
    a trigger matrix;
    a group of trigger input control registers coupled to the plurality of input triggers; and
    a group of trigger output control registers coupled to the plurality of output triggers, the group of trigger input control registers and the group of trigger output registers control the trigger matrix for interconnecting the plurality of input triggers with the plurality of output triggers.

2. A trigger router as defined in claim 1, wherein the plurality of input triggers are generated by a first bus and a second bus and at least one external trigger source.

3. A trigger router as defined in claim 1, wherein a trigger signal from a trigger source selected from among an internal trigger, a bus trigger, an external trigger, a timer and a user-defined trigger source causes the trigger router to activate.

4. A trigger router as defined in claim 3, wherein a trigger source command determines which trigger source is selected for the execution of immediate commands.

5. A trigger router as defined in claim 1, wherein the trigger router is located within a real time sequencer.

6. A trigger router as defined in claim 5, wherein the real-time sequencer is coupled to a first bus and a controller.

7. A trigger router as defined in claim 6, wherein the real-time sequencer comprises a field programmable gate array (FPGA).

* * * * *